United States Patent [19]
Johnson

[11] Patent Number: 5,623,402
[45] Date of Patent: Apr. 22, 1997

[54] MULTI-CHANNEL INVERSE CONTROL USING ADAPTIVE FINITE IMPULSE RESPONSE FILTERS

[75] Inventor: Donald B. Johnson, Algonac, Mich.

[73] Assignee: Schenck Pegasus Corporation, Troy, Mich.

[21] Appl. No.: 194,725

[22] Filed: Feb. 10, 1994

[51] Int. Cl.⁶ .............................. G05B 13/02; G06F 17/10
[52] U.S. Cl. ...................... 364/162; 364/148; 364/724.19
[58] Field of Search ............. 364/724.03, 724.1–724.19, 364/160–163, 724.2, 148–152, 164, 165, 176, 177, 724.01; 381/71, 94

[56] References Cited

U.S. PATENT DOCUMENTS

| | | |
|---|---|---|
| 3,878,724 | 4/1975 | Allen . |
| 4,494,214 | 1/1985 | Bernard et al. ..................... 364/724.14 |
| 4,546,426 | 10/1985 | Häfner et al. . |
| 4,634,946 | 1/1987 | Moulds, III et al. . |
| 4,636,972 | 1/1987 | Boland .............................. 364/724.14 |
| 4,663,703 | 5/1987 | Axelby et al. . |
| 4,694,401 | 9/1987 | Higuchi . |
| 4,707,780 | 11/1987 | Gose et al. . |
| 4,791,597 | 12/1988 | Miron et al. ........................ 364/724.03 |
| 4,896,285 | 1/1990 | Ishikawa et al. . |
| 4,949,236 | 8/1990 | Yeh et al. . |
| 5,105,377 | 4/1992 | Ziegler, Jr. . |
| 5,124,626 | 6/1992 | Thoen . |
| 5,155,422 | 10/1992 | Sidman et al. . |
| 5,157,596 | 10/1992 | Alcone . |
| 5,226,000 | 7/1993 | Moses et al. ........................ 364/724.1 |
| 5,272,656 | 12/1993 | Genereux ........................... 364/724.19 |
| 5,440,641 | 8/1995 | Kuusama ................................. 381/71 |

OTHER PUBLICATIONS

Bellanger, M., Digital Processing of Signals Theory and Practice, pp. 309–311, Apr. 1990, Le Plessis-Robinson, France.

Carl Schenck, AG, ITFC, pp. 1–33, Germany.
Widrow, Bernard, Adaptive Inverse Control, pp. 1–5, Stanford, CA.
Widrow et al., Adaptive Signal Processing For Adaptive Control, pp. 265–270, Stanford, CA.
Craig, J.B., ITFC—How It Works And Where To Use It, pp. 1–68, Sep. 1979, Germany.

Primary Examiner—Roy N. Envall, Jr.
Assistant Examiner—Thomas E. Brown
Attorney, Agent, or Firm—Reising, Ethington, Barnard & Perry, PLLC; James D. Stevens

[57] ABSTRACT

A method and apparatus for multi-channel control of a multiple input, multiple output, servo-driven plant utilizes finite impulse response (FIR) filters to model the inverse of the plant. Each channel includes a servo FIR filter that generates a servo command to drive the plant's servo controller, a valve current FIR filter that bypasses the PID stage of the servo controller to avoid undesirable effects of the PID loop, and a cross FIR filter for each of the remaining channels that compensates for physical coupling in the plant between the channels. The servo FIR filter is calculated by an adaption routine that involves applying an identification signal to the plant, applying the plant's response to the filter and then updating the filter's coefficients using the error that exists between the identification signal and the filter output. To reduce the convergence time, the identification signal is separated into parts in accordance with the amplitude spectral response of the plant and the parts are applied sequentially. The valve current and cross FIR filters are calculated using a forward drive adaption routine in which the identification signal is applied to the filter and the filter output to the plant. The forward drive adaption routine utilizes the phase response of the plant which is provided by way of another FIR filter that includes the inverse amplitude frequency response of the plant. Non-linear error correction is provided via an error store that provides an error correction that is added to the desired command.

50 Claims, 21 Drawing Sheets

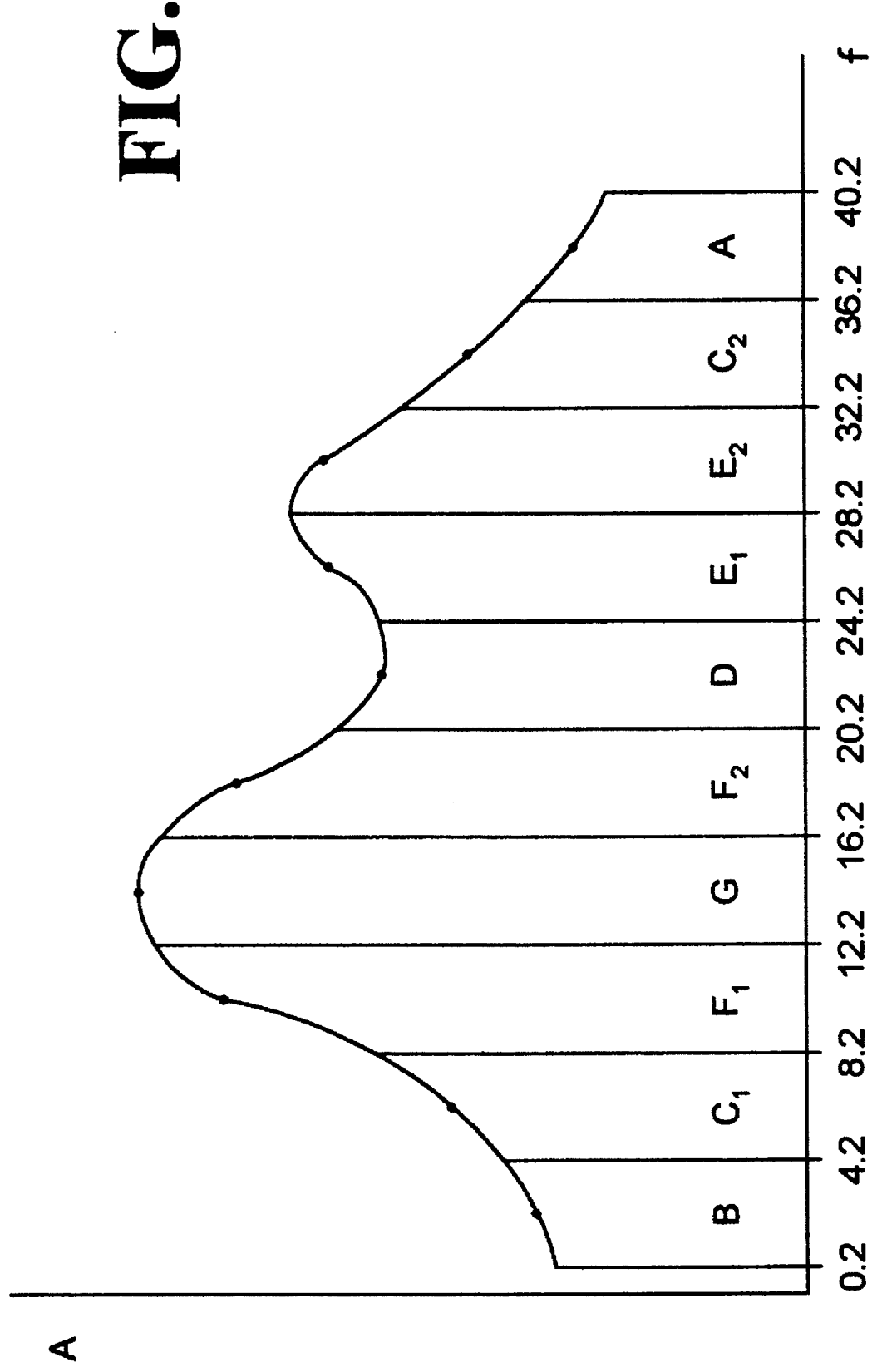

MULTI-CHANNEL INVERSE CONTROL USING ADAPTIVE FINITE IMPULSE RESPONSE FILTERS

TECHNICAL FIELD

The present invention relates generally to the use of adaptive time domain digital filters for generating an inverse model of a multiple input, multiple output plant and to the use of the inverse model in controlling the plant so that its response closely duplicates a desired command. In particular, the present invention relates to the use of non-recursive filters such as finite impulse response (FIR) filters in a controller to control the plant such that the error between the desired command and the actual response of the plant is minimized.

BACKGROUND OF THE INVENTION

In many types of systems it is desirable to control a physical device in such a manner that the device performs the command with as great an accuracy as possible. An exemplary type of such system is used in automotive suspension testing where the vehicle suspension is subjected to simulated road surface excitations for performance and fatigue testing. This testing can be performed by fixing the vehicle in a test rig and using hydraulic actuators to drive the suspension in accordance with a stored signal (desired command). The desired command represents road surface excitations for which testing of the suspension is desired and may have been obtained by a measurement of actual service loadings on a proving ground or other road surface.

In this type of suspension testing, it is desirable that the hydraulic actuators accurately reproduce the road surface excitations represented by the desired command. Thus, for example, if the desired command includes a 2 g acceleration at 10 Hz, the actuator that drives the suspension should accelerate the suspension by 2 g's at 10 Hz. Additionally, the actuators should be driven to provide a response that retains the phase relationships of the different spectral components of the desired command, since, for example, several different components of small amplitude can have a significant effect if they are all applied in phase. However, real devices, whether hydraulic actuators or otherwise, have their own unique transfer functions that result in their responses having frequency specific phase shifts and amplitude variations. Consequently, driving the device directly with the desired command will not produce the desired results.

Controllers have been developed that attempt to account for the transfer function of the device being controlled. They operate to modify the desired command in such a manner as to correct for the device's transfer function. These controllers operate under the simple concept that if the controller models the inverse of the transfer function of the device (referred to more generally as the plant or system), then the joint effect of first modifying the desired command by the inverse transfer function and then applying the modified command to the plant will be that the response of the plant will exactly match the desired command. Although simple in theory, the difficulty in practice arises from limitations inherent in the modelling processes heretofore used.

Historically, these controllers have operated by using frequency domain signal processing techniques. One such controller is described in the paper entitled "ITFC—A Computer Based Control System for Fatigue Testing and Service Loading Simulation," Carl Schenck AG, and in the paper entitled "ITFC—How it works and where to use it," J. B. Craig, Carl Schenck AG, 1979. The controller operates to iteratively generate and update a drive file that comprises sequences of modified command signals that will cause the plant to reproduce the desired command. These sequences of modified command signals are generated by iteratively generating the modified command signals until the error between the plant's response and the desired command falls within a prescribed tolerance. Each iteration involves: determining the error between the desired command and the plant's response using the modified command signal determined during the previous iteration to drive the plant; converting that error into the frequency domain using a Fast Fourier Transform (FFT); generating a corrected signal by multiplying the spectral components of the error by the appropriate elements of a predetermined inverted frequency response function; and then performing an inverse Fourier Transform to return the corrected signal to the time domain. The corrected signal is then multiplied by selected factors and added to the modified command signal generated during the previous iteration to produce the next iteration of the modified command signal. Once the error is sufficiently minimized, the drive file containing the final version of the modified command can be used to drive the plant for performance or fatigue testing. During this testing, the response of the plant can be recorded and later compared to the desired command.

The inverted frequency response function is initially determined during an identification phase in which an identification input having a selected power spectral density is used to excite the plant. The plant's response is measured and the frequency response function is calculated by dividing the averaged cross spectral density (CSD) between the identification input and the measured response by the averaged power spectral density (PSD) of the identification input. The last step is inversion of the frequency response function which provides the inverted frequency response function. For a multiple (N) channel controller that provides channel to channel decoupling, an N×N matrix of frequency response functions must be generated. Each of the matrix's rows are generated by using the identification input for the channel corresponding to that row, measuring the responses of each of the N controlled variables within the plant, and generating the frequency response functions between the identification input and each of the measured responses.

The updating of the modified command signal is performed off-line. That is, for each iteration, the modified command signal determined from the previous iteration is used to drive the plant and the plant's response is recorded. The recorded response is then used to determine off-line the next iteration of the modified command signal in the manner described above.

There are various significant problems inherent in this frequency domain solution to inverse modelling. One is that the sheer complexity of the calculations involved in the transformations between the time and frequency domain have typically meant that the calculations must be performed off-line. Also, the calculation of the frequency response function and then its inversion can result in divisions by zero that may be difficult to resolve. Additionally, these frequency analysis techniques are inherently block-oriented and the desired command is typically separated in the time domain into many segments that are processed separately, resulting in a loss of phase between the segments. Furthermore, there is no way to compare the response to the desired command in real time, making it difficult to limit the error that might occur due to fatigue or failure of the specimen.

More recently, it has been suggested that the modelling be carried out in the time domain using adaptive FIR filters to first model the inverse and then control the plant. See, e.g., "Adaptive Inverse Control," Bernard Widrow, 1986, and "Adaptive Signal Processing For Adaptive Control," Bernard Widrow et al., 1984. Inverse identification is accomplished by driving the plant with the desired command, using the response of the plant as the input to the FIR filter, delaying the desired command, and updating the filter's coefficients in accordance with the mean square error between the delayed command and the output of the FIR filter. Multiple iterations of this process are carried out until the mean square error is satisfactorily minimized. One disadvantage of this method of inverse modelling is that for some frequencies (e.g., higher frequencies), the plant may provide no response at all and, as a result, the adaption routine will not result in any coefficients in the FIR filter for those frequencies.

Another problem that arises with this method of inverse modelling is that plant noise will bias the inverse solution. To resolve the noise problem, Widrow calculates the inverse from a model of the plant. However, this is a two-step process that involves an off-line calculation of the model reference plant inverse. Widrow further teaches accounting for plant noise with an adaptive noise cancellation scheme that uses a copy of the plant to determine the noise and then modifies the noise using another FIR filter that models the plant inverse without delay. The modified noise is then fed back and subtracted from the input to the plant and the copy of the plant. One limitation of this approach is that it is a feedback system in which the delays around the loop may limit its ability to perform noise cancellation. Also, the inverse model used to feedback the noise may not provide an accurate model of the plant inverse.

Another problem with using time domain digital filters and an adaption routine to determine the plant inverse is that the adaption speed (i.e., convergence time) of the filter is dependent upon the smallest eigenvalue of the input Autocorrelation matrix of the signal used to update the filter's coefficients. Thus, the convergence time depends on the ratio of the extreme eigenvalues of the power spectral density of the signal. This theoretical limitation on the convergence time is discussed in *Digital Processing of Signals—Theory and Practice*, 2d ed., Maurice Bellanger, pp. 309–311. Because the relative amplitudes of the spectral content of the signal used for adapting the filter can be relatively large, the convergence time can be undesirably long.

In many applications, the device being controlled is operated by way of a servo controller that contains a proportional plus integral plus derivative (PID) controller. This arrangement is used in servo-hydraulic systems such as the above-mentioned hydraulic actuators used in automotive suspension testing. For the purposes of plant inverse identification, the plant must be considered as including not only actuator itself, but the servo controller as well. This is because the output of the inverse model drives the actuator via the servo controller and so the transfer function seen between the output of the inverse model and the response of the actuator includes not only the transfer function of the actuator, but also that of the servo controller. One problem encountered in driving the commands through the servo controller is that the PID gains may be too low for the actuator to provide the desired response. Also, the servo loop may itself add undesirable dynamics which, when combined with non-linearities in the servo loop, make it desirable to reduce the servo loop gain.

SUMMARY OF THE INVENTION

In accordance with the present invention there is provided a multi-channel controller that uses time domain digital filters to provide adaptive inverse control of a multiple input, multiple output system. Preferably, finite impulse response filters are used as the adaptive filters. The invention provides two adaption routines for generating an inverse model of the system.

In accordance with one aspect of the present invention, the first adaption routine provides a method of producing a time domain digital filter having a transfer function that is the inverse of the system. This adaption routine is useful where the system produces noise at frequencies outside of a frequency range within which control of the system is desired. The method comprises the steps of:

(a) applying to the system an input signal that includes frequency components within a desired range of frequencies, (b) filtering out of an electrical representation of the system response any noise generated by the system that is outside the desired range of frequencies to thereby provide a filtered representation of the system's response, (c) applying the filtered representation to an adaptive time domain digital filter, the digital filter thereby generating a digital filter output signal, (d) delaying the input signal, (e) determining an error using the digital filter output signal and the delayed input signal, (f) updating the digital filter's coefficients in accordance with the error, and (g) iteratively repeating steps (c) through (f).

The digital filter's coefficients can be updated by an equation that uses the error, the filtered representation, a convergence gain, and a window function that forces the coefficients at both ends of the filter to zero. Preferably, any frequency components of the input signal that are outside the desired range of frequencies are filtered out prior to step (a).

In accordance with another aspect of the present invention, a forward drive inverse identification adaption routine is provided. The forward drive adaption routine comprises the steps of:

(a) transforming an input signal into a compensated input signal using an adaptive time domain digital filter, (b) applying the compensated input signal to a system that provides a system response in accordance with a system transfer function, (c) transforming the input signal into an adjusted input signal using a transfer function that has substantially the same phase as the system transfer function, (d) delaying the input signal, (e) determining an error using the system response and the delayed input signal, (f) updating the filter's coefficients using the adjusted input signal and the error, and (g) iteratively repeating steps (a), (b), (d), (e), and (f).

Preferably, the adjusted input signal is determined using a second time domain digital filter. When the second filter is used, the error is delayed prior to updating the first filter's coefficients to account for the added delay introduced by the second digital filter. The second digital filter has substantially the same phase response as the system, but preferably provides the inverse amplitude frequency response to help minimize the convergence time of the first filter. The second digital filter coefficients can be calculated using the first adaption routine and then transposing the coefficients.

In accordance with another aspect of the present invention, the system is controlled by way of a servo controller that includes a PID stage. To avoid problems introduced due to the servo loop, the output of first digital filter can be injected at the output of the PID stage to thereby bypass the PID stage. The adjusted input signal used to generate the first filter's coefficients would then be determined using the second filter and the inverse of the PID stage's transfer function.

In accordance with yet another aspect of the present invention, a method is provided for cross channel decoupling in a multiple input, multiple output system in which there is physical coupling between the multiple controlled variables. Decoupling is provided by using a time domain digital filter that adjusts one channel's controlled variable using another channel's input in such a manner as to compensate for physical coupling between the controlled variables. The method comprises the steps of:

(a) providing a first time domain digital filter within the first channel that transforms a first input signal into a first digital filter output signal, (b) providing a first cross coupling time domain digital filter between the first and second channels such that the first cross coupling filter transforms the first input signal into a first cross coupling filter output signal that is provided to the second channel, and (c) generating coefficients for the first cross coupling filter using multiple iterations of the following steps:

(c1) applying the first input signal to the first digital filter, (c2) applying the first input signal to the first cross coupling filter, (c3) adjusting the first controlled variable using the first digital filter output signal and adjusting the second controlled variable using the first cross coupling filter output signal, (c4) acquiring an electrical representation of the response of the second controlled variable to the adjustments of the first and second controlled variables, (c5) determining a second channel error using the electrical representation of the response of the second controlled variable, and (c6) updating the first cross coupling filter's coefficients using the second channel error.

The coefficients of the first digital filter can also be determined at the same time, in which case:

step (c4) further comprises acquiring an electrical representation of the response of the first controlled variable to the adjustments of the first and second controlled variables, step (c5) further comprises delaying the first input signal and determining a first channel error using the delayed first input signal and the electrical representation of the response of the first controlled variable, and step (c6) further comprises updating the first digital filter's coefficients using the first channel error.

The calculations of the coefficients for the first channel's digital filters can be done concurrently with those of the second channel. Alternatively, the second channel can be disabled, in which case the first cross coupling filter adjusts the second controlled variable on its own and the second channel error is equal to the electrical representation of the response of the second controlled variable.

If servo loop control is used to adjust the controlled variables, then the cross FIR filters can be injected before or after the PID stage of the servo controller.

In accordance with another feature of the present invention, a method is provided for generating coefficients for a time domain digital filter. The method can be used with any of a variety of adaption routines and comprises the steps of:

(a) providing a composite input signal having a spectral content, (b) providing a filter update signal that is related to the composite input signal, (c) determining the amplitudes of the spectral components of the filter update signal, (d) providing a plurality of input signals using the spectral content of the composite input signal, wherein the input signals have different spectral contents determined in accordance with the amplitudes of the spectral components of the filter update signal, and (e) calculating the coefficients with an adaption routine by sequentially using the input signals as an identifying input signal of the adaption routine.

In particular, the input signals are determined by determining the amplitudes of the spectral components of the filter update signal at selected frequencies, associating one or more of the spectral components of the composite input signal with each of the selected frequencies, and providing the input signals such that they have different spectral contents determined by:

(d1) identifying groups of the selected frequencies such that, for each group having more than one of the selected frequencies, the ratio of the amplitudes of any two of the spectral components of the filter update signal at the selected frequencies within that group is less than or equal to a maximum value, (d2) associating each of the groups with a different one of the input signals, and (d2) for each input signal, forming the input signal by combining together those spectral components of the composite input signal that are associated with the selected frequencies within the group associated with that input signal.

An adaption routine can be used which comprises (f) performing multiple iterations of the following steps:

(f1) using the identifying input signal to adjust a controlled variable, the controlled variable thereby providing a resultant response, (f2) acquiring an electrical representation of the resultant response, (f3) determining an error using the identifying input signal and the electrical representation of the resultant response, and (f4) updating the coefficients using the error and the filter update signal.

Preferably, the sequential application of the input signals is carried out additively and in order starting with the input signal corresponding to the lowest amplitude spectral content of the filter update signal and ending with the input signal corresponding to the highest amplitude spectral content of the filter update signal.

The composite input signal is preferably determined using the following steps:

(a1) providing a command that is to be used to adjust the controlled variable after generation of the coefficients, (a2) determining the amplitudes of the spectral components of the command, (a3) determining the composite input signal using an adjustable input signal and a plurality of adjustment factors, each of which corresponds to a different frequency band of the adjustable input signal and each of which is used to selectively amplify or attenuate the amplitudes of the spectral components of the adjustable input signal that are within its corresponding frequency band, (a4) adjusting the controlled variable using the adjustable input signal, (a5) acquiring a second feedback signal representing the response of the controlled variable to the adjustable input signal, (a6) determining the amplitudes of the spectral components of the second feedback signal, (a7) adjusting the adjustment factors in accordance with the relative amplitudes of the spectral components of the second feedback signal and the command, (a5) iteratively repeating steps (a3) through (a7) until the amplitudes of the spectral components of the second feedback signal are approximately the same as the amplitudes of the corresponding spectral components of the command, and for each frequency band, associating the spectral components of the composite input signal within that frequency band with one of the selected frequencies.

In accordance with yet another feature of the present invention, there is provided a method of generating an error correction for a controller that is responsive to a command to control a system in such a manner as to cause the system to perform the command. The method comprises the steps of:

(a) combining a desired command with an error correction to thereby generate a corrected command, (b) transforming the corrected command into a compensated command using a time domain digital filter that approximates the inverse of a system's transfer function, (c) applying the compensated command to the system, (d) acquiring an electrical representation of the response of the system to the compensated command, (e) delaying the command, (f) determining an error using the delayed command and the electrical representation, (g) updating the error correction using the error, and (h) iteratively repeating steps (a) through (g).

In accordance with another feature of the present invention, the foregoing features are utilized together to provide a channel for a controller having a plurality of channels, each of which is operable in response to a command to generate an output that is used to control a system in such a manner as to cause the system to perform the command. The channel comprises a controller input for receiving a first channel command, a controller output providing a system command and capable of being coupled to a system to apply the system command to the system, an error store for providing an error correction, a first summing junction coupled to said controller input and said error store, said first summing junction being operable to combine the first channel command with the error correction to thereby generate a modified first channel command, a servo controller having an input and an output coupled to said controller output, a first time domain digital filter having an input coupled to receive the modified first channel command and an output coupled to said input of said servo controller, a second time domain digital filter having an input coupled to receive the modified first channel command and an output coupled to said output of said servo controller, a third time domain digital filter having an input coupled to receive a second channel command and an output coupled to said servo controller, a feedback input capable of being coupled to the system to thereby provide an electrical representation of a system response to the system command, a delay coupled to said controller input to provide a delayed first channel command, and a second summing junction coupled to said delay, said feedback input, and said error store, wherein said second summing junction is operable to combine the delayed first channel command with the electrical representation to thereby generate an error and to provide the error to said error store.

BRIEF DESCRIPTION OF THE DRAWINGS

A preferred exemplary embodiment of the present invention will hereinafter be described in conjunction with the appended drawings, wherein like designations denote like elements, and:

FIG. 8 is an amplitude frequency response plot of the plant to the shaped noise signal;

DESCRIPTION OF THE PREFERRED EMBODIMENT

Figure 1:
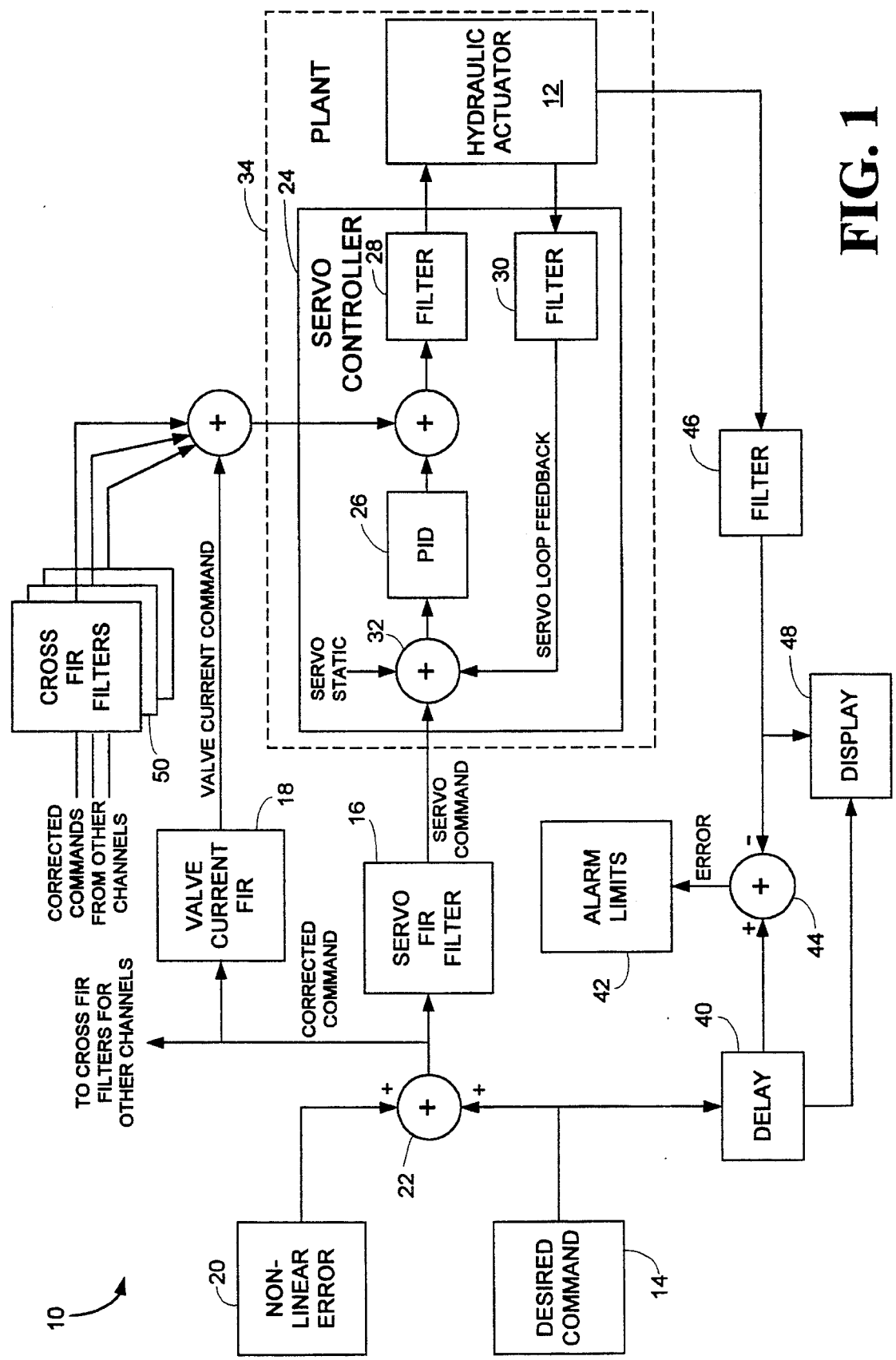
FIG. 1 is a block diagram showing an adaptive controller of the present invention driving a plant.

FIG. 1 shows a controller of the present invention, designated generally as 10, that is operable to adjust a controlled variable, such as a hydraulic actuator 12, in accordance with a desired command 14. Controller 10 includes a servo FIR filter 16, a valve current FIR filter 18, a non-linear error store 20, and a summing junction 22. In general, controller 10 is operable to adjust actuator 12 by way of servo FIR filter 16 and valve current FIR filter 18 in such a manner that actuator 12 performs desired command 14.

In particular, desired command 14 is a stored command signal that is combined by summing junction 22 with an error correction signal provided by error store 20. The corrected command provided by junction 22 is provided as the input to both the servo and valve current FIR filters 16 and 18. As discussed in greater detail below, servo FIR filter 16 generates a servo command and valve current FIR filter 18 generates a valve current command, both of which are used to obtain the desired response from actuator 12.

Controller 10 adjusts hydraulic actuator 12 by way of a servo controller 24. In accordance with conventional practice, servo controller 24 includes a PID stage 26, an output filter 28, and a PID feedback filter 30. PID stage 26 has an input that receives the servo command from servo FIR filter 16, a servo loop feedback from PID feedback filter 30, and a servo static (d.c.) command, all of which are combined together by a summing junction 32. PID stage 26 also includes an output that controls actuator 12 via output filter 28. As will be known by those skilled in the art, servo controller 24 controls the current to a valve (not shown) that in turn controls the flow of hydraulic fluid to and from actuator 12. A feedback signal relating to the response of actuator 12 to the output of servo controller 24 is coupled to the input of PID stage 26 to provide closed loop control.

In order that actuator 12 performs desired command 14, servo FIR filter 16 provides a transfer function that is the inverse of the transfer function existing between the servo command (i.e., the output of servo FIR filter 16) and the response of actuator 12 to the output signals provided by servo controller 24. Thus, the inverse transfer function being modelled by servo FIR filter 16 is that of servo controller 24 together with actuator 12. As indicated in FIG. 1, servo controller 24 and actuator 12 are referred to collectively as the plant 34.

As discussed in the background section, servo controller 24 has certain inherent characteristics that produce undesirable results. It can worsen system non-linearities and may have low gains at certain frequencies that limit the ability of actuator 12 to provide the desired response. These undesirable effects are not accounted for by servo FIR filter 16. Therefore, compensation is provided by way of valve current FIR filter 18 which is used to inject a signal after PID stage 26 of servo controller 24. This has the effect of driving the valve current directly with FIR filter 18. One benefit of this arrangement is that the ability of controller 10 to force actuator 12 to provide the desired response is no longer limited by the PID gains. Thus, the gain provided by PID stage 26 can be reduced to reduce the dynamic effects of the servo loop on the response.

Controller 10 also includes circuitry for real-time response verification; namely a delay 40, an alarm circuit 42, a summing junction 44, a bandpass filter 46, and a display, such as a CRT 48. As will be discussed in greater detail below, since controller 10 and plant 34 together provide a fixed delay between desired command 14 and the plant response, real time verification of the response of actuator 12 to controller 10 can be provided by shifting desired command 14 in time by the fixed delay and comparing the delayed desired command 14 to the response of plant 34. The necessary fixed delay is provided by delay 40. The response of plant 34 is provided by way of bandpass filter 46 which receives an electrical representation of the response. The filtered response provided by bandpass filter 46 is subtracted from the delayed desired command 14 at summing junction 44 to thereby provide an error signal equal to the deviation of the response of actuator 12 from desired command 14. This error is provided to alarm circuit 42 which monitors the error. Alarm circuit 42 can include one or more alarm limits that are used to detect failure or near failure of the specimen. Real-time response verification is also provided graphically using display 48. The delayed desired command 14 and the filtered response can be simultaneously displayed on the same screen. This provides a convenient way for the test operator to verify the performance of controller 10 and plant 34.

The electrical representation of the resultant response of plant 34 can be provided by way of a feedback from a transducer. Any suitable transducer can be used for this purpose depending on the type of controlled desired. For example, transducers can be used that provide force, position, velocity, acceleration or other information regarding the response of plant 34 to controller 10. Furthermore, the transducer used for inverse modelling can, but need not be, the same transducer used for the servo loop. It will be understood that the controlled variable for which inverse modelling is provided will depend upon the type of transducer used. In the illustrated embodiment, the feedback transducer is a linear accelerometer in which case the controlled variable is acceleration. Although the feedback is shown in the figures as coming from actuator 12, it will be appreciated that the transducers can either be mounted on the device being controlled by controller 10 (e.g., directly on actuator 12) or can be mounted on the specimen, as is desired for a particular application.

Controller 10 can be a multiple channel controller in which case the components shown in FIG. 1 would together comprise one of the channels of the controller. Decoupling of actuator 12 from the other physical devices within plant 34 is accomplished by way of cross coupling filters 50. For an n-channel controller, each channel includes n–1 cross FIR filters 50. Each of the n–1 filters shown for the depicted channel couple the corrected command from a different one of the other channels to servo controller 24 to control actuator 12 in such a manner as to compensate for the effect on actuator 12 of the adjustments of the other physical devices by the other channels. Although the decoupling signals provided by cross FIR filters 50 are preferably injected after PID stage 26, they could instead be injected into the front end (i.e., junction 32) of servo controller 24. Of course, different coefficient update equations would be used to calculate the cross FIR filters depending upon the point of injection into the depicted channel of controller 10.

It will be appreciated that because servo FIR filter 16 and valve current FIR filter 18 model the inverse of the plant and non-linear error store 20 compensates for the limitations in those models, the FIR filters 16 and 18 and error store 20 must be generated anew each time a different plant is used. Furthermore, cross FIR filters 50 must also be generated each time a different plant is used since they compensate for plant-specific coupling between the devices being controlled by each channel. The construction shown in FIG. 1 is that of a completed controller for which the FIR filters and error store have already been determined. Preferably, controller 10 includes the necessary circuitry and/or programming to permit the FIR filters and error store to be regenerated each time a new plant is used. The remainder of this description of the preferred embodiment will be devoted to the methods and arrangements used to generate the FIR filters and error store.

DETERMINATION OF THE FIR FILTER COEFFICIENTS AND THE NON-LINEAR ERROR STORE

Figure 2:
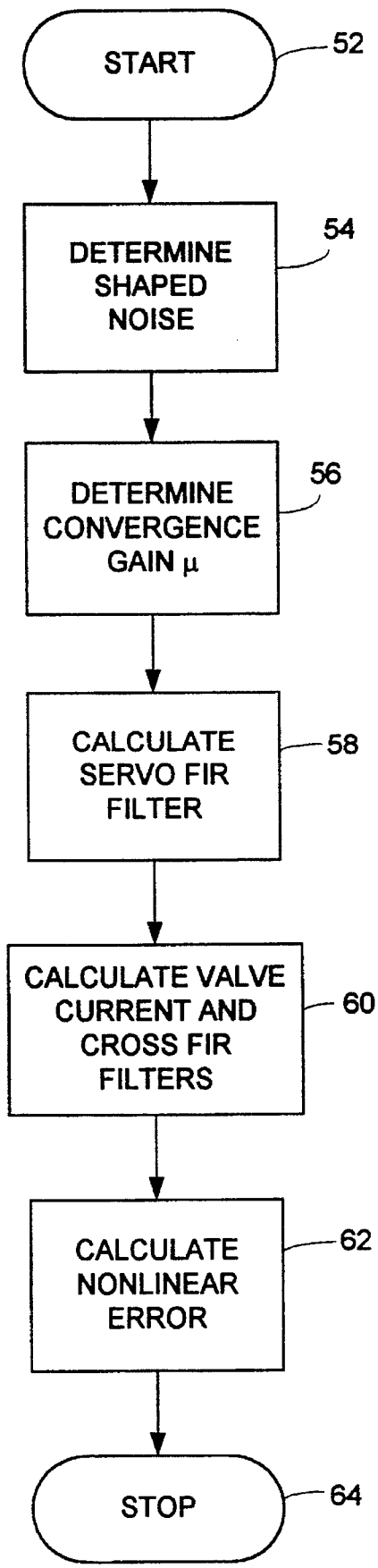
FIG. 2 is a flow chart showing the process for adapting the controller of FIG. 1 to the plant inverse.

FIG. 2 shows an overview of the process for generating the FIR filters and error store. The process begins at start block 52. The initial step (block 54) is the determination of a shaped noise signal that is used to excite the plant for the purpose of generating the coefficients of the servo and valve current FIR filters 16 and 18. The next step (block 56) is to determine a convergence gain that is used in updating the coefficients during calculation of the FIR filters' coefficients. The servo FIR filter 16 coefficients are then calculated (block 58), followed by calculation of the coefficients for valve current FIR filter 18 and cross FIR filters 50 (block 60). Finally, the non-linear error is determined (block 62) and the process ends at stop block 64.

Generation of Shaped Noise For Use In Plant Inverse Identification

Determination of the shaped noise signal will now be described in conjunction with FIGS. 3, 4A, and 4B. The purpose of the shaped noise signal is that it can be used to excite resonant frequencies that need to be identified and it provides a shaped spectrum that is formed from spectral components whose amplitudes are limited to safe levels. The limits on the amplitudes are needed so that the plant is not destroyed in the process of modelling its inverse. The spectral content of the shaped noise is limited to the range of frequencies over which operation of actuator 12 is desired. For example, the desired (i.e., working) range may be from 0.2 Hz to 40.2 Hz.

The shaped noise is a composite noise signal formed from an adjustable input signal and a plurality of adjustment factors each of which amplifies or attenuates the amplitudes of different ones of the spectral components of the adjustable input signal. The composite noise signal can be generated either using a single noise signal whose spectral components are altered by their corresponding adjustment factors or by using a plurality of noise bands having spectral components that are first altered by the adjustment factors and then combined to provide the composite signal. For simplicity, the adjustable input signal will be treated as a plurality of noise bands that together span the working frequency range. For the illustrated embodiment, ten bands will be used, although twenty bands are preferable for the embodiment being described. Of course any number of bands can be used depending upon the application. Since the working range spans 40 Hz, each band has a bandwidth of 4 Hz, with the first band extending from 0.2 Hz to 4.2 Hz, the second from 4.2 Hz to 8.2 Hz and so on, with the last band extending from 36.2 Hz to 40.2 Hz. The shaped noise can then be defined by the following equation:

$$\text{shaped}(n) = A_1 \text{noise}_1 \sin(\omega_1 n + \theta_1) + \quad (1)$$
$$A_2 \text{noise}_2 \sin(\omega_2 n + \theta_2) +$$
$$\vdots$$
$$A_{10} \text{noise}_{10} \sin(\omega_{10} n + \theta_{10}),$$

where:

$A_1, A_2, \ldots A_{10}$ are the adjustment factors, $\text{noise}_1, \text{noise}_2, \ldots \text{noise}_{10}$ are the noise bands having a bandwidth of 4 Hz, $\omega_1, \omega_2, \ldots \omega_{10}$ are the center frequencies of the noise bands, and $\theta_1, \theta_2, \ldots \theta_{10}$ are the phases of the carrier waves.

Figure 3:
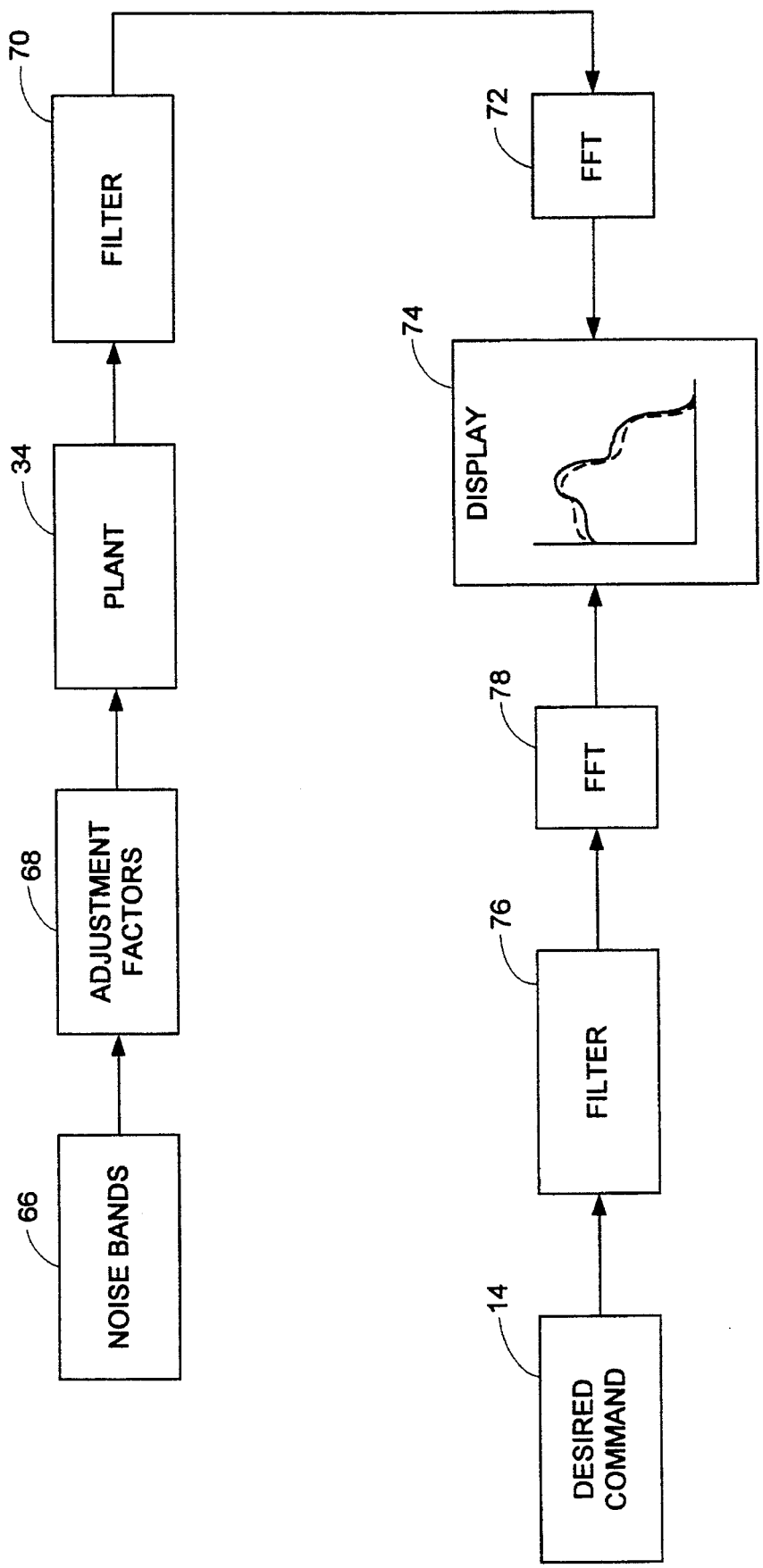
FIG. 3 is a block diagram showing a preferred circuit for generating a shaped noise signal used for identification of the plant inverse.
Figure 4A:
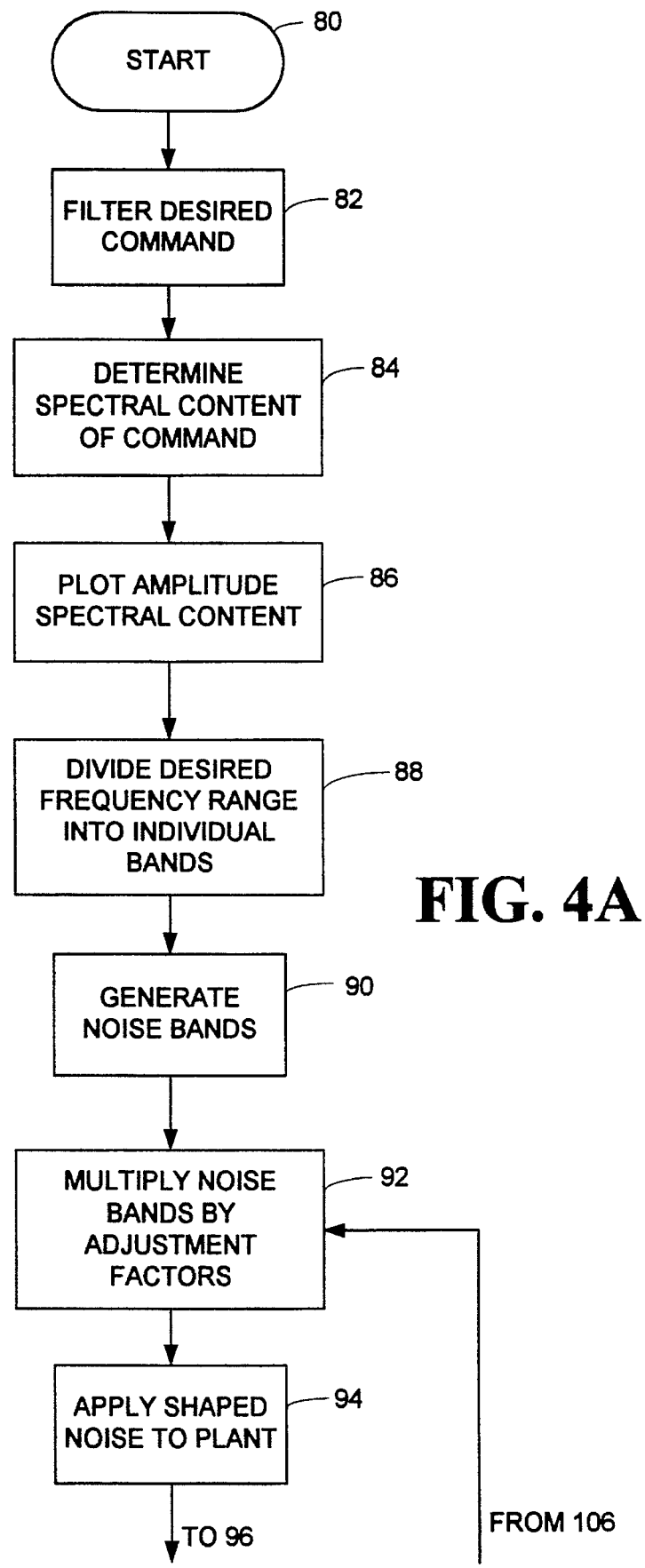
FIGS. 4A and 4B together comprise a flow chart that shows the process for generating the shaped noise signal.
Figure 4B:
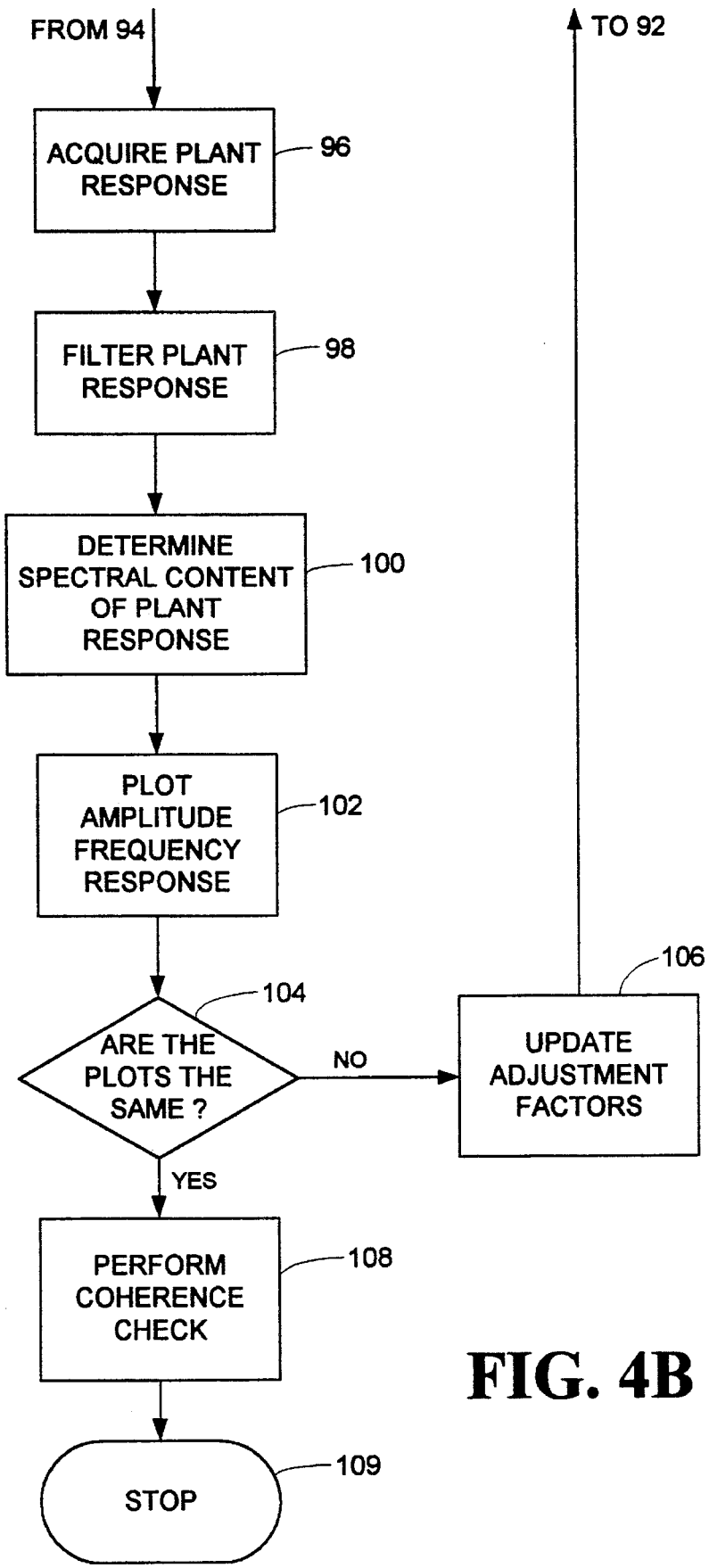

FIG. 3 depicts the arrangement used to determine the proper adjustment factors for the shaped noise. A function generator 66 provides the adjustable input signal (e.g., the ten noise bands). A gain stage 68 applies each of the ten adjustment factors to its corresponding noise band. The resulting composite signal (i.e., shaped noise) is used to drive the plant 34 and the resultant response from plant 34 is acquired and filtered by a bandpass filter 70 which passes only those frequencies within the working frequency range of 0.2 Hz to 40.2 Hz. The filtered response is then transformed into the frequency domain by an FFT 72. The spectral content of the plant response to the shaped noise is shown on a display 74. Also plotted on display 74 is the amplitude spectral content of desired command 14. This is achieved by first filtering desired command 14 by a second bandpass filter 76 that has the same characteristics as filter 70. The filtered desired command 14 is then transformed by an FFT 78 that provides the amplitude spectral content of the filtered desired command 14 to display 74.

The use of the circuit of FIG. 3 to determine the adjustment factors will now be described in connection with the flow chart of FIGS. 4A and 4B. Briefly, the process involves iteratively updating the adjustment factors for the noise bands until the plant's response to the shaped noise signal is such that the amplitudes of its spectral components are approximately the same as the amplitudes of the spectral content of the desired command. The purpose of this iterative process is to minimize any damage to the specimen during identification of the inverse model. It allows the amplitudes of the noise to be brought up from safe levels to only those amplitudes needed to get the frequency response required for the actual test.

The process begins at start block 80. The first part of the process is determination and display of the spectral content of desired command 14. Thus, the desired command is first filtered (block 82) by bandpass filter 76. The spectral content of the filtered desired command 14 is then determined (block 84) by way of FFT 78. The spectral content is then plotted (block 86) on display 74. The working frequency range is then divided into the ten bands (block 88), although this step could be done at anytime prior to applying the adjustment factors to the ten noise bands. The noise bands are then generated (block 90) using function generator 66.

The next part of the process is to iteratively determine the correct values for each of the adjustment factors so that the amplitude frequency response of plant 34 to the shaped noise will be substantially the same as the amplitude spectral content of desired command 14. The first step of the adjustment loop is to apply the individual adjustment factors to the noise bands to thereby generate the shaped noise signal (block 92). This is done by gain stage 68. The shaped noise is then used to drive the plant (block 94). A feedback signal or other electrical representation of the plant response is then acquired (block 96). This feedback signal is then filtered (block 98) by bandpass filter 70 to remove components outside the working range. The amplitude frequency response of plant 34 is then determined (block 100) by applying the filtered feedback signal to FFT 72 and is thereafter plotted on display 74 (block 102).

The next step in the process is to compare the amplitude frequency response of plant 34 with the amplitude spectral content of desired command 14 (block 104). If the plots are approximately the same then no further updating of the adjustment factors is needed and the shaped noise signal is ready for use, subject only to a coherence check of the plant. If the plots are not yet sufficient similar, then the adjustment factors are updated (block 106) and another iteration is performed, beginning back at block 92 and using the noise bands generated at block 90.

Once no further updating of the adjustment factors is needed, a coherence calculation is performed (block 108) to determine whether the plant is responding adequately to the shaped noise. If there is good coherence between the shaped noise signal and the plant's response, then the shaped noise signal is ready to be used to calculate the servo FIR filter 16 coefficients and the process therefore ends at stop block 109. If the coherence is poor and cannot be sufficiently improved by adjustment of the adjustment factors, then one of two courses of action can be taken: the plant set-up can be changed and the shaped noise regenerated, or calculation of the FIR filters can be undertaken notwithstanding the poor coherence and non-linear error store 20 can be relied upon to provide the necessary compensation for the poor coherence.

Servo FIR Filter Adaption Routine

Figure 5:
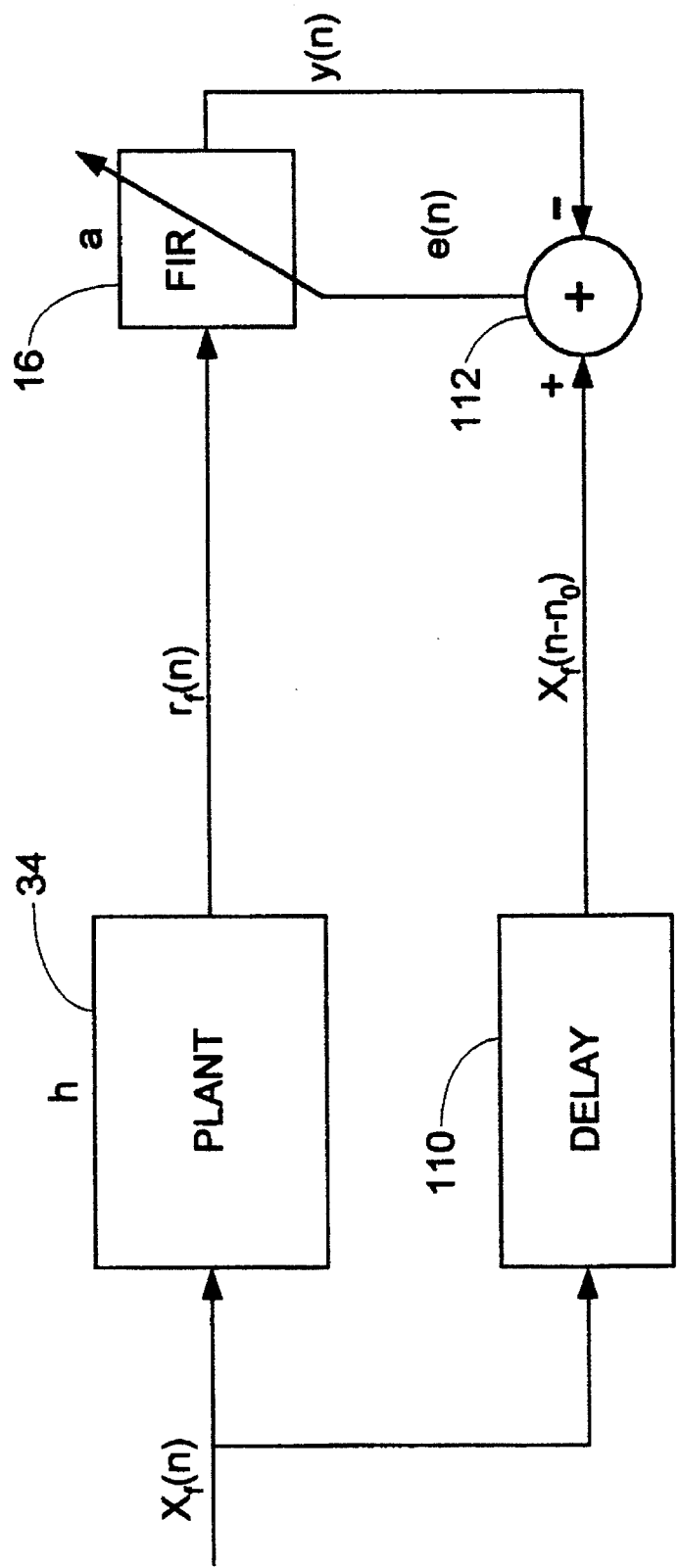
FIG. 5 is a block diagram showing the fundamental approach used to calculate the coefficients for a servo FIR filter used in the controller of FIG. 1.
Figure 6:
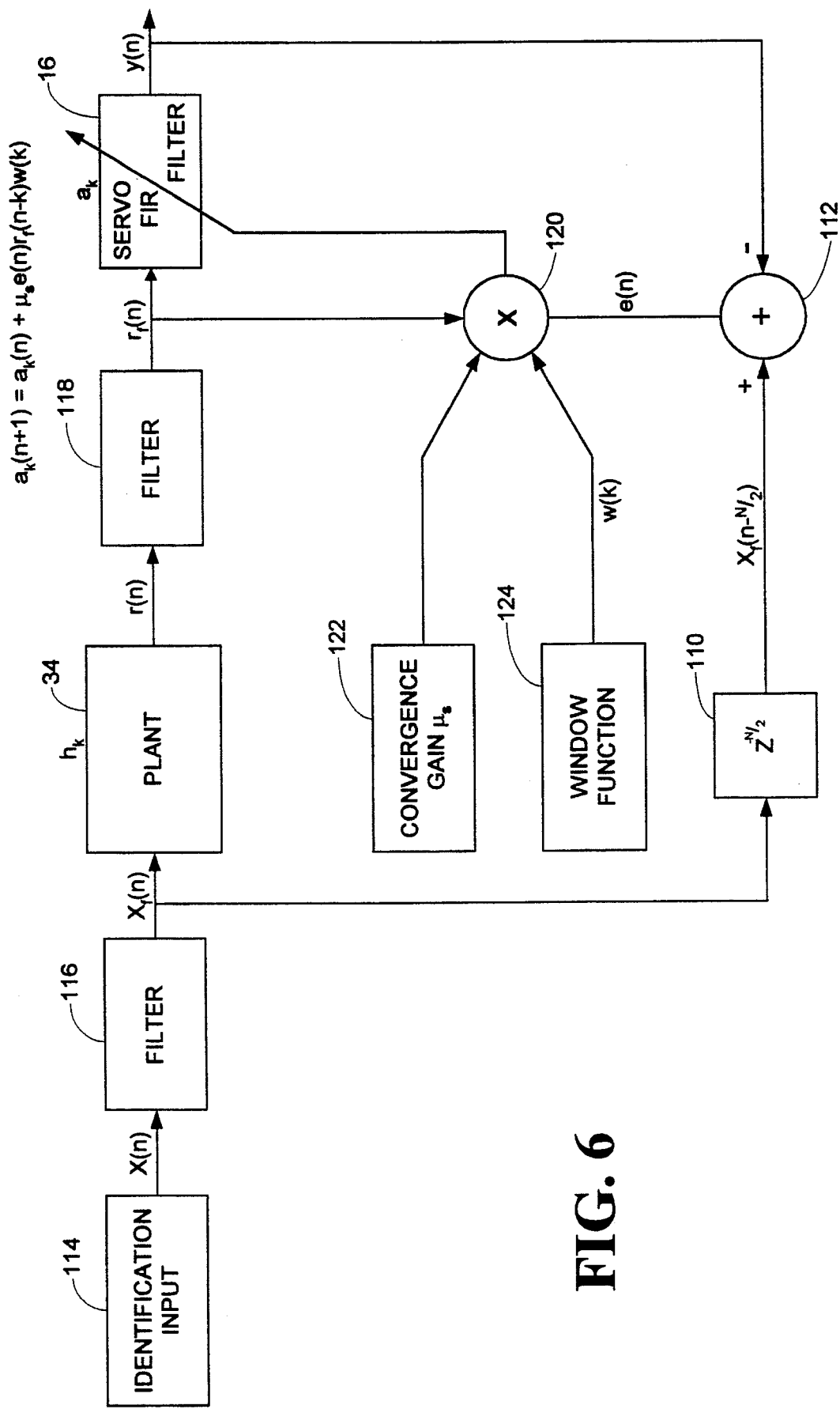
FIG. 6 is a block diagram showing a preferred circuit for generating the coefficients of the servo FIR filter shown in FIG. 1.
Figure 7:
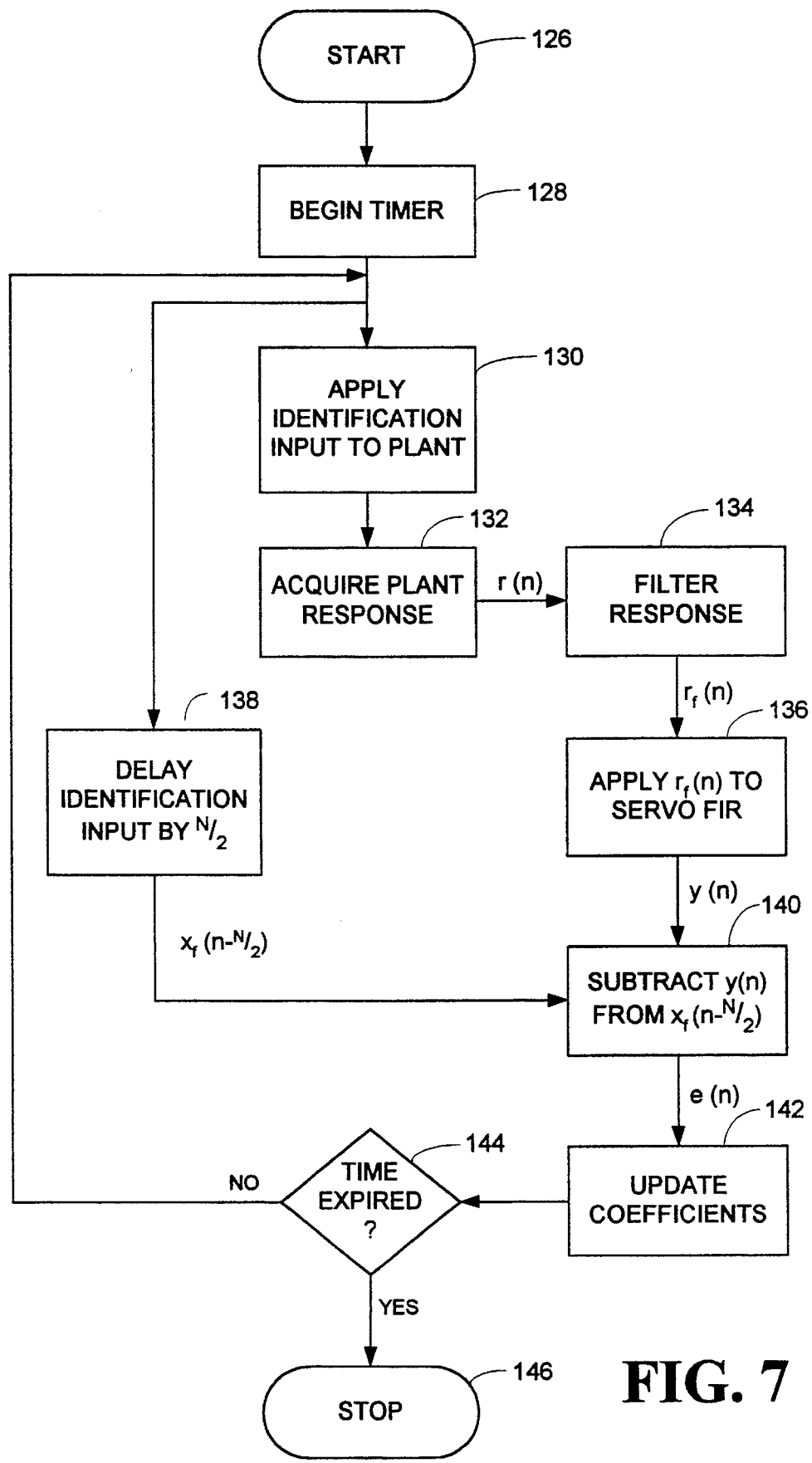
FIG. 7 is a flow chart showing the adaption routine used to generate the coefficients of the servo FIR filter.

Referring now to FIGS. 5–7, the method and arrangement for calculation of the coefficients for servo FIR filter 16 will be described. FIG. 5 depicts the fundamental approach used to generate the servo FIR filter coefficients. In general, servo FIR filter 16 is iteratively adapted to model the inverse of the transfer function of plant 34 by repeatedly driving an input into plant 34, driving the plant's response into servo FIR filter 16, and then updating the filter coefficients until the output of the FIR filter is a near exact copy of the input used to drive the plant. In order to adapt the filter coefficients to provide this inverse model, the FIR filter coefficients are updated so as to minimize the mean square error between the input to the plant and the output of the FIR filter.

In particular, a filtered identification signal $x_f(n)$ is applied to plant 34. A filtered electrical representation $r_f(n)$ of the resultant response of plant 34 to $x_f(n)$ is acquired using a feedback device. As mentioned above, for the servo-hydraulic system utilized in plant 34 of the illustrated embodiment, a linear accelerometer is used as the feedback device. However measured, $r_f(n)$ is applied to servo FIR filter 16 which generates a digital filter output signal $y(n)$ which is a copy of the identification signal $x_f(n)$ to the extent that servo FIR filter 16 models the inverse transfer function of plant 34. Initially, the coefficients of servo FIR filter 16 are all zero. They are updated iteratively for each of the data points contained in the identification signal $x_f(n)$. This is done by delaying $x_f(n)$ by a fixed amount that is greater than any of the frequency-specific phase shifts provided by plant 34. Moreover, by choosing a delay that is much greater than that caused by plant 34, the negative time coefficients needed within servo FIR filter 16 to make a causal system can be generated. This delay is provided by delay 110. The delayed identification signal $x_f(n-n_0)$ is provided to a summing junction 112 that operates to subtract the digital filter output signal $y(n)$ from $x_f(n-n_0)$ to thereby generate an error $e(n)$.

Servo FIR filter 16 is updating in accordance with a coefficient update equation that operates to minimize the mean square error $E\{e^2(n)\}$. The coefficient update equation for servo FIR filter 16 can therefore be expressed as follows:

$$a_k(n+1) = a_k(n) + \mu_s [-\nabla E\{e^2(n)\}], \tag{2}$$

where:

$a_k(n+1)$ is the next update of the coefficient
$a_k(n)$ is the current value of the coefficient $a_k$, and
$\mu_s$ is a servo convergence gain.
This equation can be rewritten as:

$$a_k(n+1) = a_k(n) - \mu_s \frac{\partial E\{e^2(n)\}}{\partial a_k}, \tag{3}$$

which can be further simplified:

$$a_k(n+1) = a_k(n) - \mu_s E\left\{ \frac{\partial e^2(n)}{\partial a_k} \right\}. \tag{4}$$

By inspection of FIG. 5, it can be seen that:

$$\frac{\partial e^2(n)}{\partial a_k} = \frac{\partial}{\partial a_k} \left[ x\left(n - \frac{N}{2}\right) - y(n) \right]^2, \tag{5}$$

where N is the number of coefficients of servo FIR filter 16. Expanding the squared term yields:

$$\frac{\partial e^2(n)}{\partial a_k} = \frac{\partial}{\partial a_k} \left[ x^2\left(n - \frac{N}{2}\right) - 2x\left(n - \frac{N}{2}\right) y(n) + y^2(n) \right]. \tag{6}$$

Since the identification signal is not influenced by the coefficients of servo FIR filter 16, this equation becomes:

$$\frac{\partial e^2(n)}{\partial a_k} = \left[ -2x\left(n - \frac{N}{2}\right) + 2y(n) \right] \frac{\partial y(n)}{\partial a_k}, \tag{7}$$

which reduces to:

$$\frac{\partial e^2(n)}{\partial a_k} = -2e(n) \frac{\partial y(n)}{\partial a_k}. \tag{8}$$

Again referring to FIG. 5, it can be seen that:

$$\frac{\partial y(n)}{\partial a_k} = \frac{\partial}{\partial a_k} [r_f(n) * a_k], \tag{9}$$

where the asterisk (*) denotes the convolution sum. Simplifying this equation gives:

$$\frac{\partial y(n)}{\partial a_k} = \frac{\partial}{\partial a_k} (r_0 a_0 + r_1 a_1 + \ldots + r_N a_N) = r_k(n) = r_f(n-k). \tag{10}$$

Substituting equation (10) into equation (8) and equation (8) into equation (4) yields:

$$a_k(n+1) = a_k(n) + \mu_s E\{e(n) r_f(n-k)\}, \tag{11}$$

with the factor of 2 being subsumed into the servo convergence gain $\mu_s$. This equation can be approximated by removing the expected value to yield:

$$a_k(n+1) = a_k(n) + \mu_s e(n) r_f(n-k). \tag{12}$$

It is desirable to force the coefficients at either end of the FIR filter to zero in order to avoid any discontinuities at the ends of the filter. Therefore, a window function $w(k)$ is included in the equation. Thus, the final coefficient update equation for servo FIR filter 16 is given by:

$$a_k(n+1)=a_k(n)+\mu_s e(n)r_f(n-k)w(k). \tag{13}$$

As indicated in equation (13), the filter update signal used to iteratively update the coefficients of servo FIR filter 16 is the filtered electrical representation of the response of plant 34 to the identification signal $x_f(n)$.

FIG. 6 discloses a circuit for implementing the servo FIR filter 16 coefficient update equation. The identification signal 114, denoted x(n), is first filtered by a bandpass filter 116 to provide the filtered identification signal $x_f(n)$. This signal is applied to plant 34 and to delay 110 which provides a fixed delay approximately equal to half the length of servo FIR filter 16. An electrical representation r(n) of the resultant response of plant 34 is obtained and is filtered by a second bandpass filter 118 to provide the filtered electrical representation $r_f(n)$ of the resultant response. This signal is then applied to servo FIR filter 16 and to a multiplication node 120 that is used to generate the updated coefficients for servo FIR filter 16. The output y(n) of servo FIR filter 16 is provided to summing junction 112 where it is subtracted from the delayed identification signal to provide an error signal e(n). The error signal is provided to multiplication node 120, as is the servo convergence gain 122 and window function 124. The inputs to multiplication node 120 are multiplied together and used to update the coefficients of servo FIR filter 16 in accordance with equation (13).

In the illustrated embodiment, the working frequency range is at relatively low frequencies (0.2 Hz to 40.2 Hz). Most of the noise contained in the feedback obtained from the linear accelerometer coupled to actuator 12 is at frequencies above the upper limit of this range. Thus, one advantage of the scheme of FIG. 6 is that plant noise is eliminated by using filter 118 to remove from the resultant response r(n) all frequencies outside of the working range.

Turning now to FIG. 7, the procedure for generating the coefficients of servo FIR filter 16 using the arrangement of FIG. 6 will now be described. The process begins at start block 126. Convergence is assumed upon the expiration of a fixed amount of time. Accordingly, the first step is to begin a timer (block 128) that is set for that fixed amount of time. Next, the filtered identification signal $x_f(n)$ is used to drive the plant (block 130). The electrical representation r(n) of the plant's response is then acquired (block 132) and is then filtered by bandpass filter 118 (block 134). The resulting filtered representation $r_f(n)$ is then applied to servo FIR filter 16 (block 136). During the steps represented by blocks 130, 132, 134, and 136, the identification signal is delayed (block 138) using delay 110. The output y(n) of servo FIR filter 16 is then subtracted from the delayed identification signal to generate the error e(n) (block 140). The coefficients are then updated (block 142) using equation (13) given above. Next, a check is made to see if the time has expired (block 144). If not, then the process flow returns to blocks 130 and 138 to perform another iteration of the coefficient updates. If time has expired then convergence is assumed and the process ends at stop block 146.

It will be appreciated that various criteria can be used to determine when the filter has sufficiently converged. For example, adaption could continue until the error falls below a certain value or below a certain percentage of its initial value. The particular criteria chosen need only be that which results in an inverse model that provides a sufficient level of accuracy for the particular application of controller 10.

To optimize convergence of servo FIR filter 16 using the adaption routine described above, a servo convergence gain $\mu_s$ is used. The servo convergence gain used by controller 10 is determined in accordance with the power of the input to servo FIR filter 16 and using a base value $\mu_0$ chosen by the operator. The power (P) is calculated using the last 1000 values of the signal used to update the filter (i.e., the filter update signal) by summing the squares of those last 1000 values. The base convergence gain $\mu_0$ is then determined in accordance with the equation:

$$\mu_s = \frac{\mu_0}{P}. \tag{14}$$

Sequential Application of Noise Input Signals

Determination of the coefficients for servo FIR filter 16 can be accomplished using the shaped noise signal determined above as the identification input signal $x_f(n)$ to the servo FIR filter adaption routine. However, the convergence time for the filter may be undesirably long (on the order of hours) due to the existence of large amplitude differences between the various spectral components of the signal used to update the filter coefficients (i.e., the filter update signal). These amplitude differences may arise out of a need to limit the amplitudes of certain of the spectral components of the shaped noise to avoid damaging the specimen during the identification stage. Furthermore, the problem of lengthy convergence times can occur using other adaption routines that provide other types of models (e.g., plant identification or the forward drive inverse modelling described below in connection with valve current FIR filter 18).

The convergence time is dependent on the filter update signal, which is related to the shaped noise signal. In the case of servo FIR filter 16, the filter update signal is the electrical representation $r_f(n)$ of the resultant response of plant 34 due to the shaped noise signal. For the forward drive adaption routine, the filter update signal is derived from the shaped noise using a transfer function having substantially the same phase response as that of the plant. For other adaption routines, such as are used for system identification, the filter update signal is the same as the shaped noise signal. In each case, the filter update signal is generated using the shaped noise signal.

Reducing the convergence time means reducing the range of amplitudes of the filter update signal. However, as mentioned above, the shaped noise signal may need to contain large amplitude variations of its spectral components. Therefore, rather than altering the amplitude characteristics of the shaped noise signal to reduce the convergence time, the shaped noise signal can be, in effect, separated in the frequency domain into a plurality of noise input signals that are applied sequentially. The noise input signals are chosen so that, for each noise input signal, there is a relatively small variation in the amplitudes of the spectral components of the filter update signal that result from that noise input signal. In particular, the noise input signals are selected to keep the ratio of the amplitudes of the associated spectral components of the filter update signal under some selected maximum value. The noise input signals are then applied sequentially to the adaption routine, starting with the noise input signal that results in the lowest amplitudes of the spectral content of the filter update signal and finishing with the noise input signal that results in the highest amplitudes of the spectral content of the filter update signal. In this way, the convergence time of the filter for each of the noise input signals can be kept low enough that the total convergence time of the filter using all of the noise input signals sequentially is much less than the convergence time would be if all of the noise input signals were applied together as a single signal.

FIG. 8 depicts an exemplary amplitude frequency response of plant 34 using the shaped noise signal generated as a result of the process discussed in connection with FIGS. 3, 4A, and 4B. As will be appreciated, this amplitude frequency response is also the amplitude spectral content of the filter update signal used in the servo FIR filter adaption routine. Thus, the noise input signals for the servo FIR filter adaption routine can be determine by analysis of the amplitudes of the plant's frequency response. The plant's amplitude frequency response is shown as it might be displayed along with the amplitude spectral content (not shown) of desired command 14 for the purpose of determining the adjustment factors. The ten frequency bands that correspond to the ten noise bands have been delineated in FIG. 8. Each of the ten center frequencies are indicated as a data point on the plot of the plants's amplitude frequency response. These center frequencies correspond to $\omega_0$ through $\omega_{10}$ of equation (1).

In general, the noise input signals are determined by grouping the spectral components of the shaped noise signal according to the relative amplitudes of the plant's amplitude frequency response to the shaped noise signal. Since the shaped noise signal is a composite signal formed from the ten noise bands, a convenient way to provide the noise input signals is to use one or more of the noise bands for each of the noise input signals. This can be done by comparing the amplitudes of the spectral components of the plant's response in each of the ten frequency bands shown in FIG. 8 to find groups of spectral components having similar amplitude. Moreover, if the range of amplitudes within each frequency band is not too large, then only a single one of the spectral components (e.g., the center frequency) within each band need be considered when comparing amplitudes.

Figure 9A:
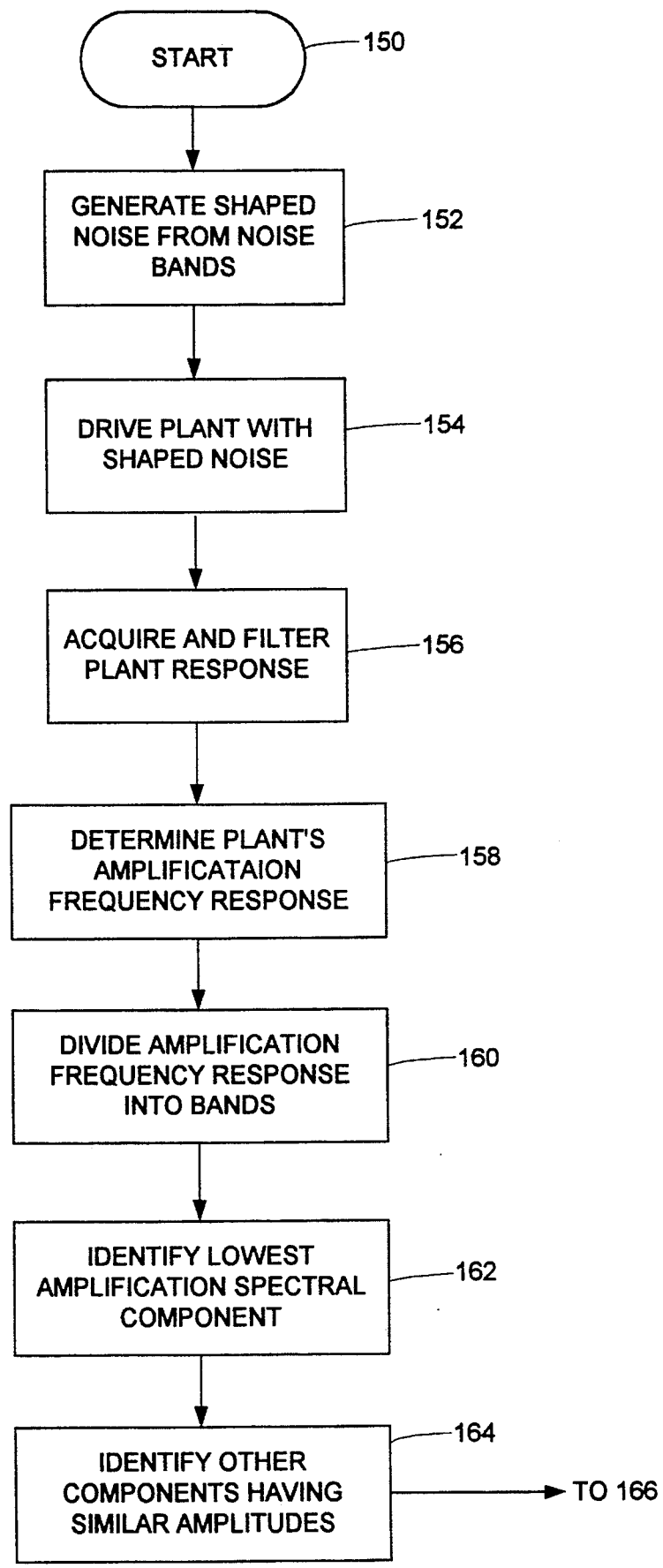
FIGS. 9A and 9B together comprise a flow chart that shows the process for determining the noise input signals used for generating the coefficients of the servo FIR filter.

A preferred method for determining the noise input signals will now be described in connection with FIGS. 9A and 9B. The process begins at start block 150. The first step is to generate the shaped noise signal (block 152) using the noise bands and adjustment factors. This is described above in connection with FIGS. 4A and 4B. The shaped noise signal is then used to drive the plant 34 (block 154). The next step is to acquire and filter the plant's response to the shaped noise (block 156). With reference also to FIG. 8, the amplitude frequency response of the plant is then determined (block 158) and divided into the ten frequency bands that correspond to the ten noise bands.

Once the amplitude frequency response of plant 34 is determined, the noise input signals can be determined. The first step (block 162) in this part of the process is to identify the spectral component of the plant's response that has the lowest amplitude. Rather than examine and compare all of the spectral components (which could be somewhat laborious if, for example, a 1024 point FFT had been used to calculate the plant's amplitude frequency response), only the ten spectral components of the plant's frequency response that are at the center frequencies of the ten frequency bands are used. Thus, for the purpose of determining the noise input signals, the amplitude frequency response determination carried out at block 158 need only include the ten center frequencies. By comparing those ten spectral components, the component having the lowest amplitude can be identified. The next step (block 164) is to identify any other of the remaining nine spectral components that have similar amplitudes. The purpose of this step is to combine together noise bands for which the associate spectral components of the plant's response have similar amplitudes, since there is no reason to run the adaption routine separately for each of those noise bands. Thus, any such noise bands will be combined together into a single one of the noise input signals. Preferably, the test for whether any of the other nine spectral components have similar amplitudes is to identify any and all of the those spectral components for which the ratio of their amplitude to that of the lowest amplitude spectral component is less than or equal to a predetermined maximum value. Preferably, the maximum value is two.

Figure 9B:
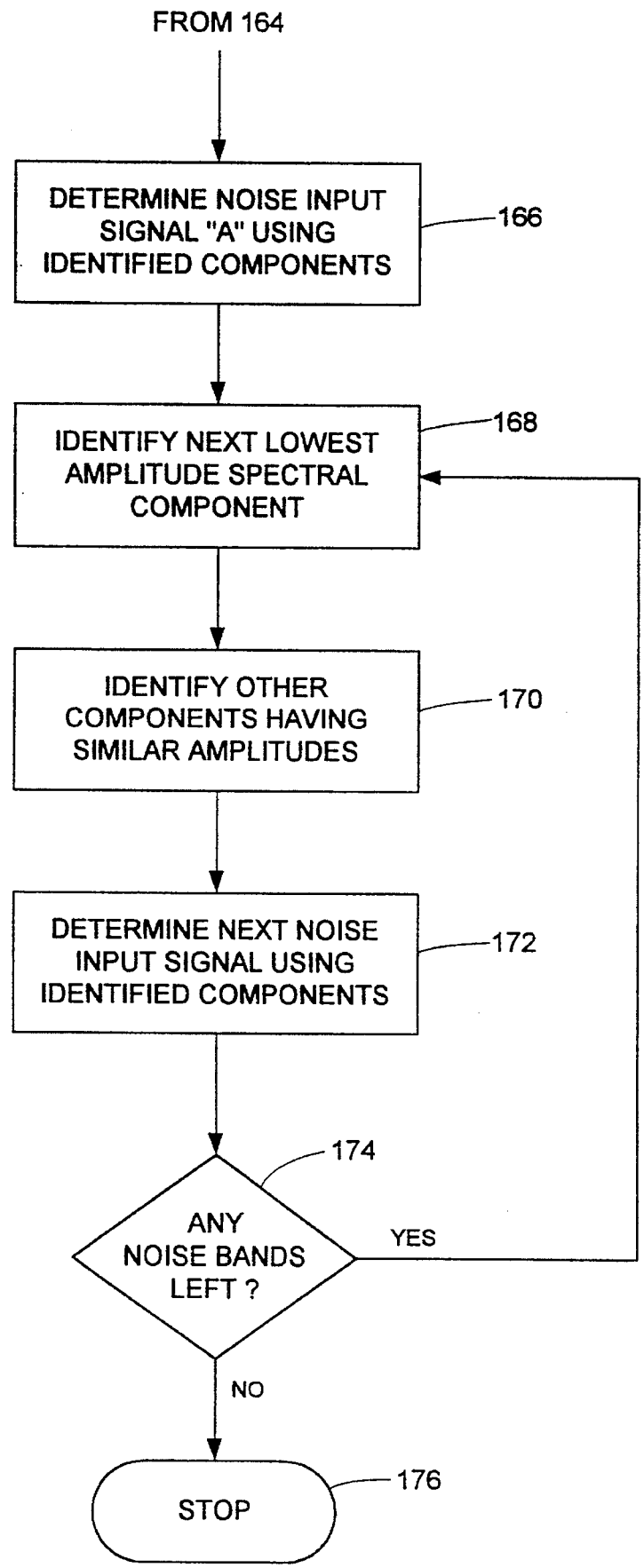

As indicated in FIG. 9B, the next step (block 166) is to determine the first noise input signal (noise input signal A) using the identified spectral component(s). For each spectral component identified in blocks 162 and 164, the noise band spanning the frequency range that includes that spectral component is selected and combined with the other selected noise bands, if any. The result is noise input signal A. The same steps performed in blocks 162, 164, and 166 are repeated for the next lowest remaining amplitude spectral component. In particular, the next lowest amplitude spectral component that was not identified in either blocks 162 or 164 is identified (block 168). Then, any other spectral components not yet selected, but that have an amplitude that is within the predetermined maximum ratio to the amplitude of the component identified in block 168 are also identified (block 170). Then, the next noise input signal is determined (block 172) using the noise bands associated with the spectral components identified in blocks 168 and 170. The next step (block 174) is to determine if there are any noise bands left that have not been used to generate one of the noise input signals (or, in other words, if there are any of the ten spectral components that have not yet been selected). If there are remaining noise bands, then the steps represented by blocks 168, 170, and 172 are repeated and another noise input signal is generated. If not, then all of the noise input signals have been generated using all of the spectral components of the shaped noise signal and the process ends at stop block 176.

This procedure for providing the noise input signals can be exemplified using the plot given in FIG. 8, Upon inspection of that figure, it can be seen that out of the ten spectral components being considered, the spectral component having the lowest amplitude is the one at 38.2 Hz and the next lowest is at 2.2 Hz. The plot of FIG. 8 is diagrammatic only and, for purposes of illustration it will be assumed that the amplitude at 2.2 Hz is significantly higher than the amplitude at 38.2 Hz. Consequently, combining the first and last noise bands into one of the noise input signals would result in a noise input signal which, when used as the identification signal of the servo FIR filter adaption routine, would result in a convergence time that is longer than is desirable. Thus, the noise band associated with last frequency band (36.2 Hz to 40.2 Hz) is used by itself as one of the noise input signals and that frequency band is therefore identified as A to indicate that its associated noise input signal is to be designated as noise input signal A. The noise band corresponding to the first frequency band is also used by itself for one of the noise input signals, that one being labelled B. However, the next noise input signal is formed from two noise bands, namely the one from 4.2 Hz to 8.2 Hz and from 32.2 Hz to 36.2 Hz. This occurs because, as shown in FIG. 8, the two spectral components at the center frequencies of those bands have nearly the same amplitude. These frequency bands are labelled $C_1$ and $C_2$, respectively to indicate that their associated noise bands are combined to form noise input signal C. This process is repeated for the remaining six spectral components at the other center frequencies, resulting in noise input signals D, E, F, and G.

The above-described method of providing the noise input signals assumes that the other spectral components within each frequency band have an amplitude that is similar to that of the spectral component at the center frequency. If the range of amplitudes within one or more of the frequency bands is too large (as might be the case, for example, in the frequency band designated $C_2$), then the amplitude frequency response can be divided into a larger number of bands. Thus, if the spectral plot of FIG. 8 were divided into twenty bands, frequency band $C_2$ would be divided into two separate bands, each of which would have an amplitude swing of approximately half that of frequency band $C_2$.

Once the noise input signals have been determined, they can be sequentially applied to the servo FIR filter adaption routine described in connection with FIG. 7. Preferably, they are sequentially applied in an additive manner (i.e., A, then A+B, then A+B+C, etc.). The noise input signals should be applied in order from the one corresponding to the lowest amplitudes of the plant's frequency response to the one corresponding to the highest amplitudes of the plant's frequency response. Thus, the first noise input signal used should be noise input signal A and the last should be noise input signal G, which, because the noise input signals are applied additively, will be applied together with the other six noise input signals A–F. This is done because not only is the servo convergence gain recalculated each time the servo FIR filter adaption routine is run, but also as discussed above, the servo convergence gain depends upon the power contained in the electrical representation of the plant's response (i.e., in the filter update signal). This means that if, for example, noise input signal G were applied before noise input signal A, the servo convergence gain resulting from the power contained in the plant's response due to noise input signal G would result in a relatively low convergence gain and the filter coefficients for the frequencies contained in noise input signal A would not be adequately identified.

Figure 10:
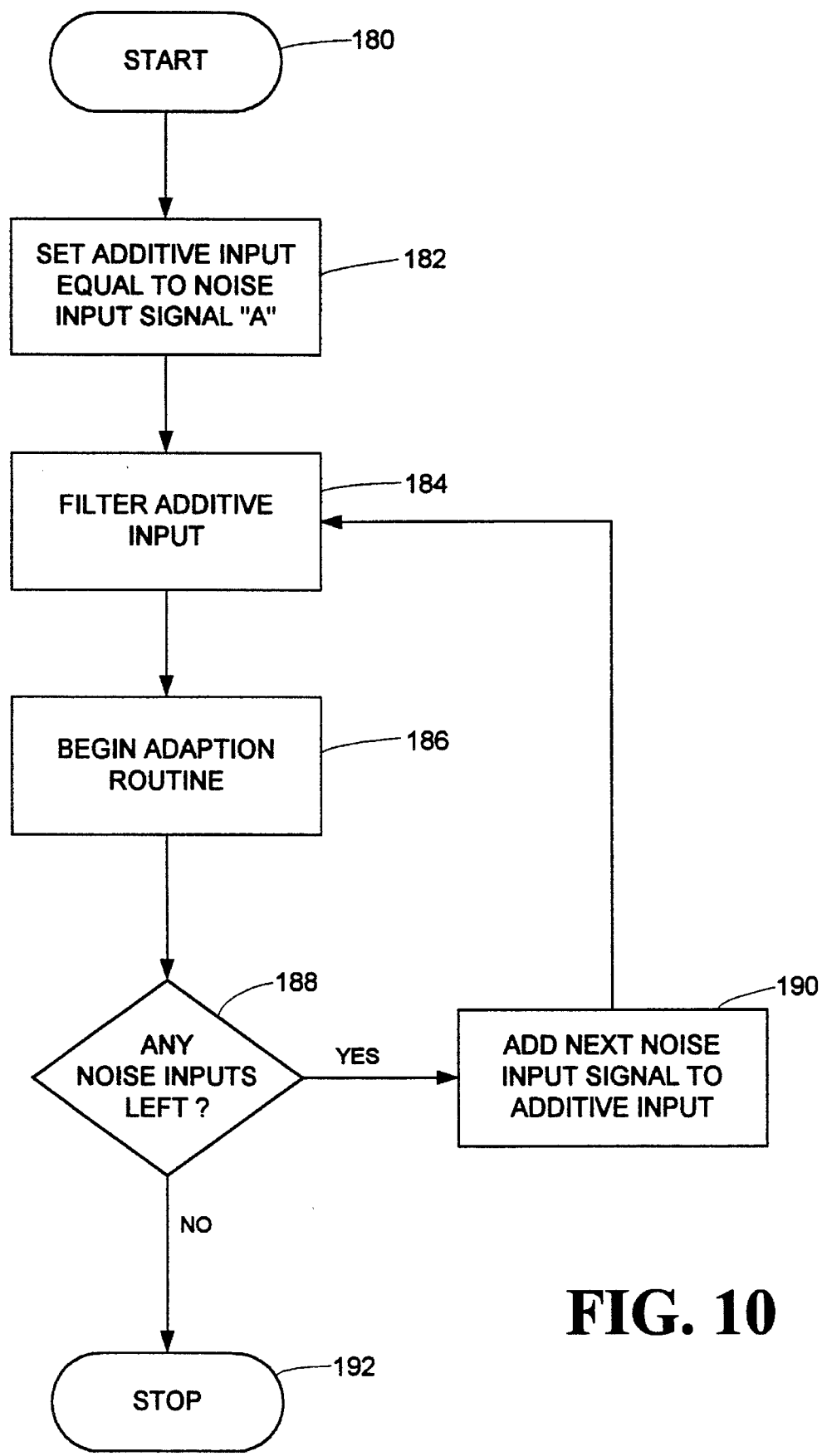
FIG. 10 is a flow chart showing the process for generating the coefficients of the servo FIR filter by sequential application of the noise input signals.

The preferred process of applying the noise input signals sequentially to an adaption routine (whether it be the servo FIR filter adaption routine or otherwise) is shown in FIG. 10. The process uses what is termed an additive input as the identification input of the adaption routine. The process begins at start block 180. The first step (block 182) is to set the additive input equal to the noise input signal associated with the lowest amplitude spectral components of the filter update signal. In the case of the servo FIR filter adaption routine and the filter update signal amplitude frequency plot given in FIG. 8, noise input signal A would be used. The additive input is then filtered (block 184) to eliminate any frequencies that are outside the working range of frequencies. Next, the adaption routine is run (block 186) using the additive input as the identification input of the adaption routine. Once the filter converges, the adaption routine ends and flow moves to block 188 where a check is made to see if there are any noise input signals that have not yet been included in the additive input. If there are one or more noise input signals that have not yet been used, then the next noise input signal (e.g., noise input signal B) is added to the additive input (block 190) and another iteration of blocks 184 and 186 is repeated using the new additive input. Once all of the noise input signals are used, the process ends at stop block 192.

It will of course be appreciated that the step of adding the next noise input signal to the additive input (block 190) is the same as, and can be carried out by, combining each the noise input signals together before the next iteration, rather than actually adding a single noise input signal to the combination of other noise input signals used for the previous iteration.

Valve current FIB Filter Adaption Routine

Figure 11:
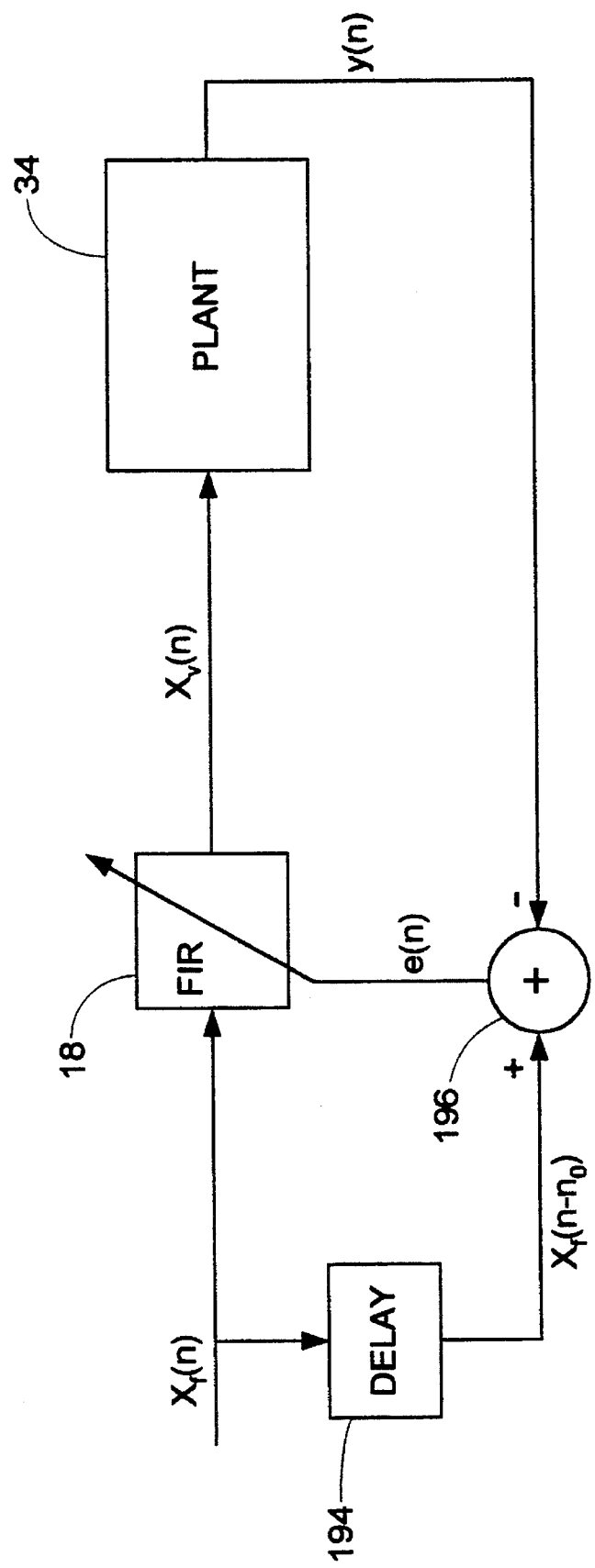
FIG. 11 is a block diagram showing the fundamental approach used to calculate the coefficients for a valve current FIR filter used in the controller of FIG. 1.

Referring now to FIGS. 11–14, 15A, and 15B the method and arrangement for calculation of the coefficients for valve current FIR filter 18 will be described. Although the approach used for adaption of servo FIR filter 16 could also be used for valve current FIR filter 18, a different approach will be used for reasons that will be explained below. FIG. 11 depicts the fundamental approach used to generate the valve current FIR filter coefficients. In general, valve current FIR filter 18 is iteratively adapted using what will be referred to as a forward drive inverse identification method. The forward drive method involves repeatedly applying an identification signal to an adaptive filter which generates a digital filter output signal, applying the digital filter output signal to the plant, and then updating the filter coefficients until the response of the plant to the digital filter output signal is a near exact copy of the identification signal. The coefficients of the valve current FIR filter 18 are updated so as to minimize the mean square error between the identification signal and the plant response.

It is noted that the forward drive inverse identification method provides continuous feedback because the updates to the filter coefficients continuously affect the drive into the plant. Also, since the filter receives the identification signal directly, the effect of the updating of its coefficients is to force the plant to produce the identification input. This is advantageous because in the scheme used for calculation of servo FIR filter 16, if the plant provides no response to a particular frequency, the adaption routine will not result in any coefficients for that frequency. In the forward drive method, however, the adaptive filter acts to modify the identification signal in such a manner as to force the system to provide a response to that frequency.

In the forward drive inverse identification method, a filtered identification signal $x_f(n)$ is applied to valve current FIR filter 18 which transforms the identification signal into a digital filter output signal $x_v(n)$, which is a compensated input that drives plant 34. Plant 34 provides a resultant response to $x_v(n)$ and an electrical representation $y(n)$ of that response is acquired. The electrical representation $y(n)$ will be a copy of the identification signal $x_f(n)$ to the extent that valve current FIR filter 18 models the inverse of the transfer function of plant 34. The coefficients of valve current FIR filter 18 are all initially zero and are iteratively updated for each of the data points contained in the identification signal. This is done using a delay 194 to delay $x_f(n)$ for a fixed amount of time and for the same reasons described in connection with the servo FIR filter adaption routine. An error signal $e(n)$ is generated by subtracting $y(n)$ from the delayed identification signal $x_f(n-n_0)$ at a summing junction 196. Error signal $e(n)$ is used to update the filter coefficients.

As discussed above in connection with FIG. 1, the output $x_v(n)$ of valve current FIR filter 18 is injected into servo controller 24 after the servo controller's PID stage. However, for the purpose of deriving the coefficient update equations, an equivalent model can be used in which $x_v(n)$ is first convolved with the PID stage's inverse transfer function (denoted $PID^{-1}$) and the convolution sum is provided to the input of servo controller 24 (i.e., the input of plant 34). This is shown diagrammatically in FIG. 12. Comparing FIG. 12 to FIG. 1, it can be seen that, rather than being injected after PID stage 26, the output of valve current FIR filter 18 is applied to a $PID^{-1}$ stage 198 with the output of $PID^{-1}$ stage 198 being applied to summing junction 32 (the input of servo controller 24) along with the servo command from servo FIR filter 16.

Figure 12:
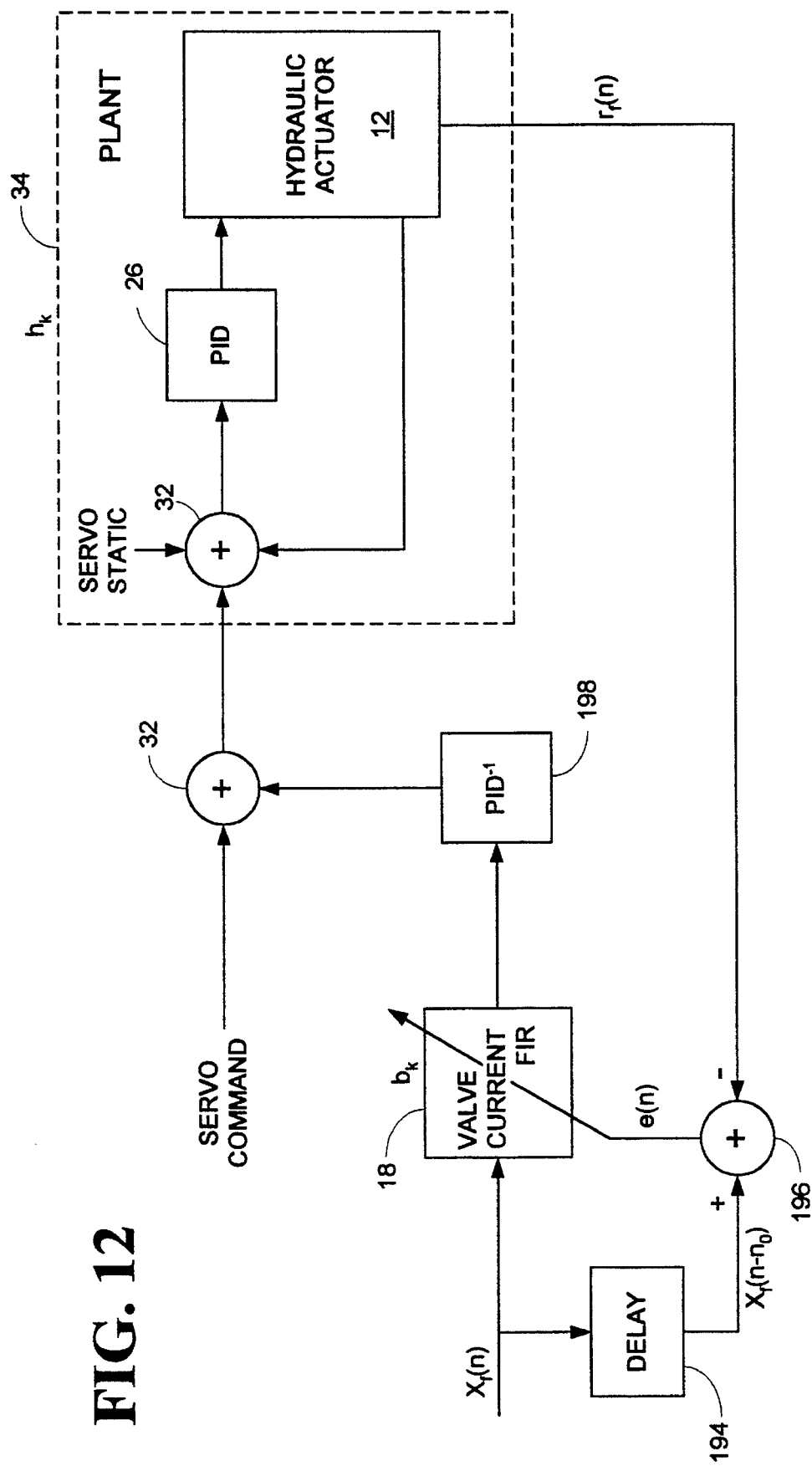
FIG. 12 is a model used to derive the coefficient update equations for the valve current FIR filter of FIG. 1.

With continued reference to FIG. 12, valve current FIR filter 18 is updated in accordance with a coefficient update equation that operates to minimize the mean square error $E\{e^2(n)\}$. The coefficient update equation for valve current FIR filter 18 can therefore be expressed as follows:

$$b_k(n+1)=b_k(n)+\mu_v[-\nabla E\{e^2(n)\}], \quad (15)$$

where:

$b_k(n+1)$ is the next update of the coefficient $b_k$, $b_k(n)$ is the current value of the coefficient $b_k$, and $\mu_v$ is a valve current convergence gain.

This equation can be rewritten as:

$$b_k(n+1) = b_k(n) - \mu_v \frac{\partial E\{e^2(n)\}}{\partial b_k}, \quad (16)$$

which can be further simplified:

$$b_k(n+1) = b_k(n) - \mu_v E\left\{\frac{\partial e^2(n)}{\partial b_k}\right\}. \quad (17)$$

By inspection of FIG. 12, it can be seen that:

$$\frac{\partial e^2(n)}{\partial b_k} = \frac{\partial}{\partial b_k}\left[x\left(n - \frac{N}{2}\right) - r_f(n)\right]^2, \quad (18)$$

where N is the number of coefficients of valve current FIR filter 18. Expanding the squared term yields:

$$\frac{\partial e^2(n)}{\partial b_k} = \quad (19)$$

$$\frac{\partial}{\partial b_k}\left[x^2\left(n - \frac{N}{2}\right) - 2x\left(n - \frac{N}{2}\right)r_f(n) + r_f^2(n)\right].$$

Since the identification signal is not influenced by the coefficients of valve current FIR filter 18, this equation becomes:

$$\frac{\partial e^2(n)}{\partial b_k} = \left[-2x\left(n - \frac{N}{2}\right) + 2r_f(n)\right]\frac{\partial r_f(n)}{\partial b_k}, \quad (20)$$

which reduces to:

$$\frac{\partial e^2(n)}{\partial b_k} = -2e(n)\frac{\partial r_f(n)}{\partial b_k}. \quad (21)$$

Again referring to FIG. 12, it can be seen that:

$$\frac{\partial r_f(n)}{\partial b_k} = \frac{\partial}{\partial b_k}[h_k * PID^{-1} * b_k * x_f(n)], \quad (22)$$

where the asterisk (*) denotes the convolution sum. Since:

$$\frac{\partial}{\partial b_k}(x_0b_0 + x_1b_1 + \ldots + x_Nb_N) = x_k(n) = x_f(n - k), \quad (23)$$

then equation (22) can be simplified to:

$$\frac{\partial r_f(n)}{\partial b_k} = h_k * PID^{-1} * x_f(n - k). \quad (24)$$

Substituting equation (24) into equation (21) and equation (21) into equation (17) yields:

$$b_k(n+1)=b_k(n)+\mu_v E\{e(n)h_k*PID^{-1}*x_f(n-k)\}, \quad (25)$$

with the factor of 2 being subsumed into the valve current convergence gain $\mu_v$. This equation can be approximated by removing the expected value to yield:

$$b_k(n+1)=b_k(n)+\mu_v e(n)h_k*PID^{-1}*x_f(n-k). \quad (26)$$

As indicated in equation (26), the coefficient update equation requires the transfer function $h_k$ of plant 34. Therefore, convergence may be slow for frequencies where $h_k$ has a low amplitude. To avoid this problem, a transposed plant transfer function $h^t$ is used in place of $h_k$. This transposed transfer function has the same phase as $h_k$, but the inverse amplitude response. Other transfer functions having the same phase as $h_k$ can be used, as it is only the phase response included within $h_k$ that is important for the coefficient update equation. Therefore, any selected transfer function $h^s$ can be used that includes the plant's phase response and that helps minimize the convergence time of valve current FIR filter 18.

The transposed transfer function $h^t$ can be calculated by determining the inverse transfer function $h^{-1}$ of the plant using the servo FIR filter adaption routine and then transposing (reversing) the coefficients. Since as shown in FIG. 2, servo FIR filter 16 is calculated prior to valve current FIR filter 18, the transposed transfer function $h^t$ can be provided using another FIR filter as a "backwards" FIR filter that is created by loading the coefficients from servo FIR filter 16 into the backwards FIR filter in reverse order. This backwards FIR filter has the effect of further delaying the identification signal $x_f(n)$ by approximately N/2. Therefore, if the backwards FIR filter is used to provide the $h^t$ term, then the error $e(n)$ must also be further delayed by a similar amount.

Using the transposed transfer function $h^t$ in place of the plant's transfer function and adding the window function $w(k)$ discussed in connection with the servo FIR filter adaption routine, the final coefficient update equation for valve current FIR filter 18 is given by:

$$b_k(n+1) = b_k(n) + \mu_v e\left(n - \frac{N}{2}\right)h^t * PID^{-1} * x_f(n-k)w(k). \quad (27)$$

$PID^{-1}$ can be approximated using the following equation:

$$PID^{-1}(x) = K\left[Px - I\sum_{k=0}^{N-1} x_k z^{-k} - D(x - xz^{-1})\right], \quad (28)$$

where:

K is a constant of proportionality,

P is a proportional gain,

I is an integral gain, and

D is a differential gain.

As indicated in equation (27), the filter update signal used to iteratively update the coefficients of valve current FIR filter 18 is the identification signal $x_f(n)$ convolved with $PID^{-1}$ and $h^t$.

Equation (27) was derived particularly for valve current FIR filter 18, which generates a digital filter output signal that is injected after the PID stage of servo controller 24. However, equation (27) can be generalized for forward drive adaption routines that involve providing the digital filter output signal to the input of servo controller 24. It can be seen that a derivation similar to that given above, but without $PID^{-1}$ stage 198 yields:

$$b_k(n+1) = b_k(n) + \mu_v e\left(n - \frac{N}{2}\right)h^t * x_f(n-k)w(k). \quad (29)$$

Figure 13:
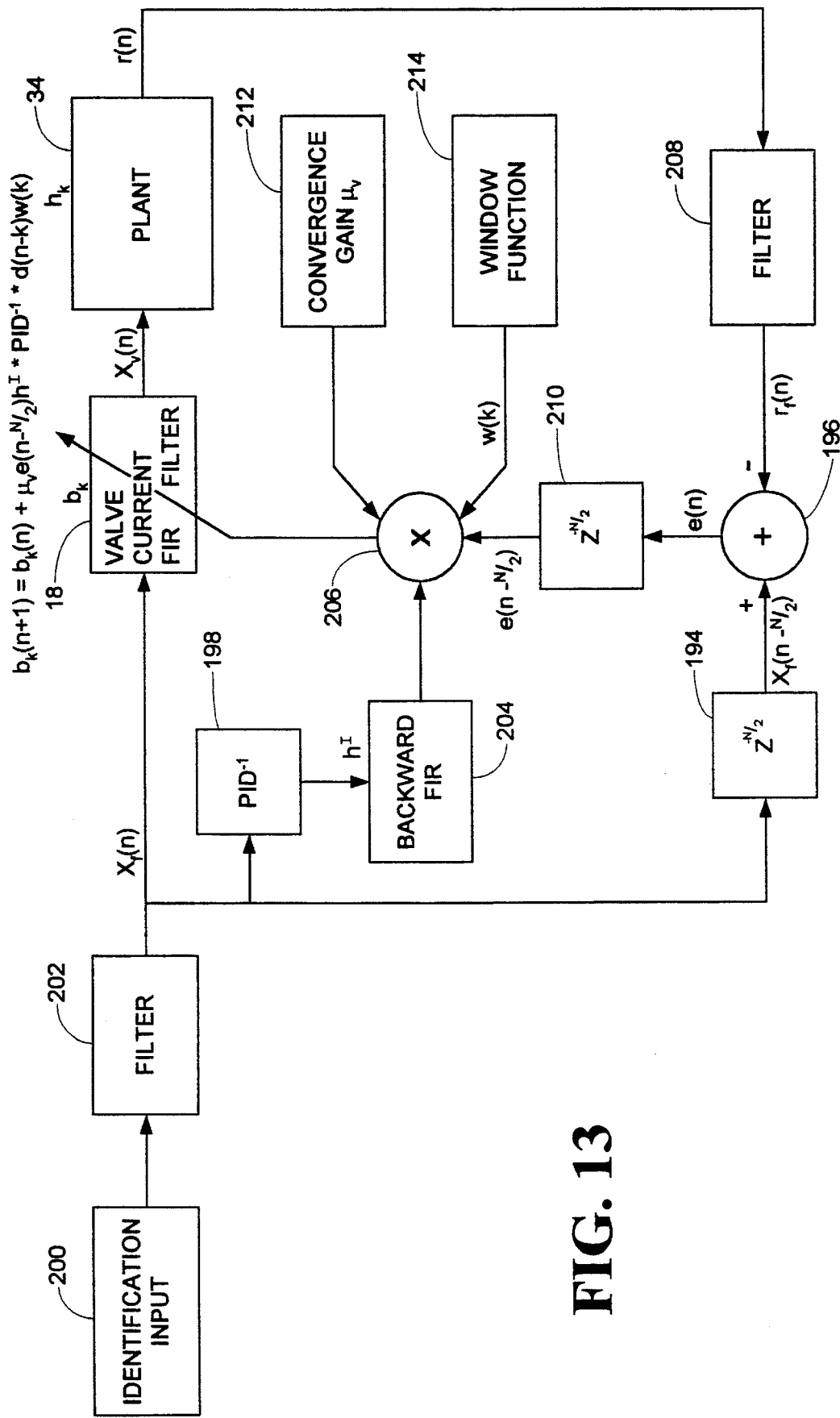
FIG. 13 is a block diagram showing a preferred circuit for generating the coefficients of the valve current FIR filter.

FIG. 13 depicts a circuit for implementing the valve current FIR filter 18 coefficient update equation. Identification signal 200 is provided to a bandpass filter 202 to provide the filtered identification signal $x_f(n)$. This signal is applied to valve current FIR filter 18, $PID^{-1}$ stage 198, and delay 194 which provides a fixed delay approximately equal to half of the length of valve current FIR filter 18. Although not shown, the filtered identification signal $x_f(n)$ is also provided to servo FIR filter 16 which generates the servo command that is provided to plant 34. The output of $PID^{-1}$ stage 198 is provided to backward FIR filter 204, which generates the filter update signal which is an adjusted input signal that is supplied to a multiplication node 206. Valve current FIR filter 18 uses the identification signal $x_f(n)$ to generate a compensated input signal $x_v(n)$ that drives plant 34. An electrical representation $r(n)$ of the resultant response of plant 34 to both $x_v(n)$ and the servo command is filtered by a bandpass filter 208 and the filtered electrical representation $r_f(n)$ is subtracted from the delayed identification input to generate the error $e(n)$. As mentioned above, backward FIR filter 204 introduces a delay into the filter update signal and the error $e(n)$ must therefore be further delayed by a delay 210 before being supplied to multiplication node 206. Valve current convergence gain 212 and a window function 214 are also provided to multiplication node 206. The inputs to multiplication node 206 are multiplied together and used to update the coefficients of valve current FIR filter 18 in accordance with equation (27).

Figure 14:
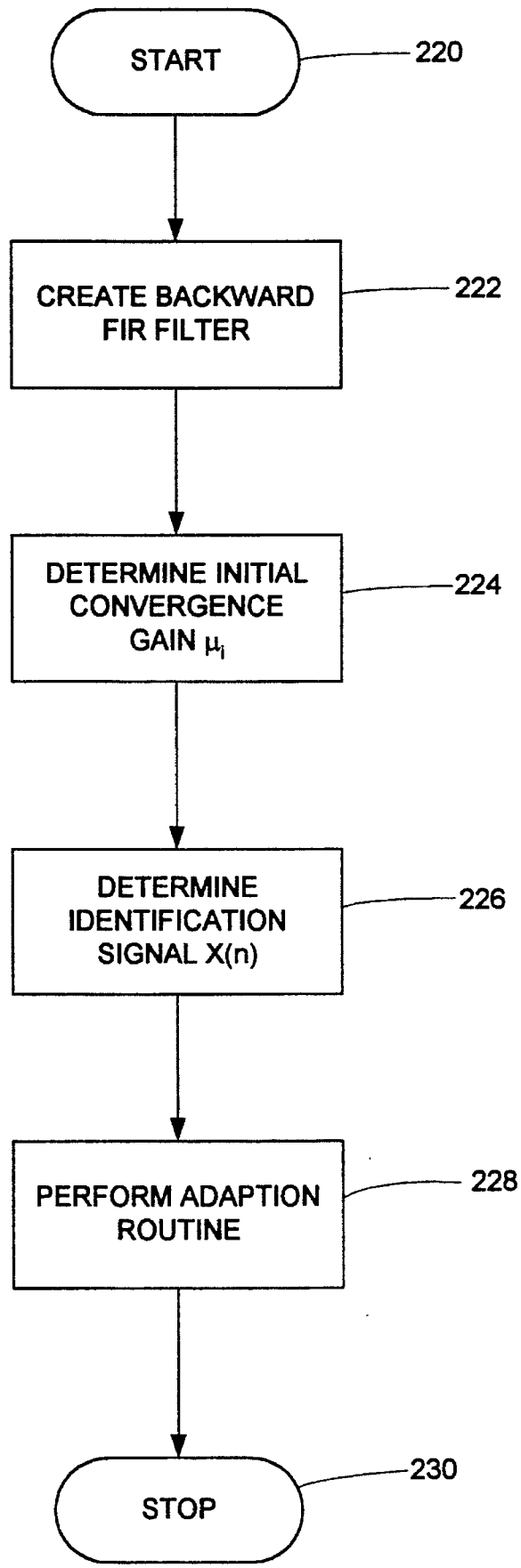
FIG. 14 is a flow chart showing the process for generating the coefficients of the valve current FIR filter.

FIG. 14 provides an overview of the procedure for generating the coefficients for valve current FIR filter 18. The process begins at start block 220. The first step is to create backwards FIR filter 204 (block 222). The procedure for generating this FIR filter was described above. The next step is to determine an initial value of the valve current convergence gain $\mu_v$ (block 224). The initial value of $\mu_v$ is determined in the same manner as for the servo FIR filter adaption routine. However, unlike the servo convergence gain which remains the same throughout the servo FIR filter adaption routine, the valve current convergence gain will be updated after each update of the valve current FIR filter coefficients. The next step is to provide the identification signal used for adaption of valve current FIR filter 18 (block 226). The feedback amplitude frequency response obtained from plant 34 during the final iteration of the procedure for generating the shaped noise signal is used as the identification signal. This is done because the feedback amplitude frequency response represents a safe feedback response for the plant. Finally, the adaption routine for generating the coefficients is performed (block 228) and once the filter has converged, the process ends at stop block 230. If desired, the identification signal could be separated into various input signals and applied sequentially, as is done for the servo FIR filter adaption routine.

Figure 15A:
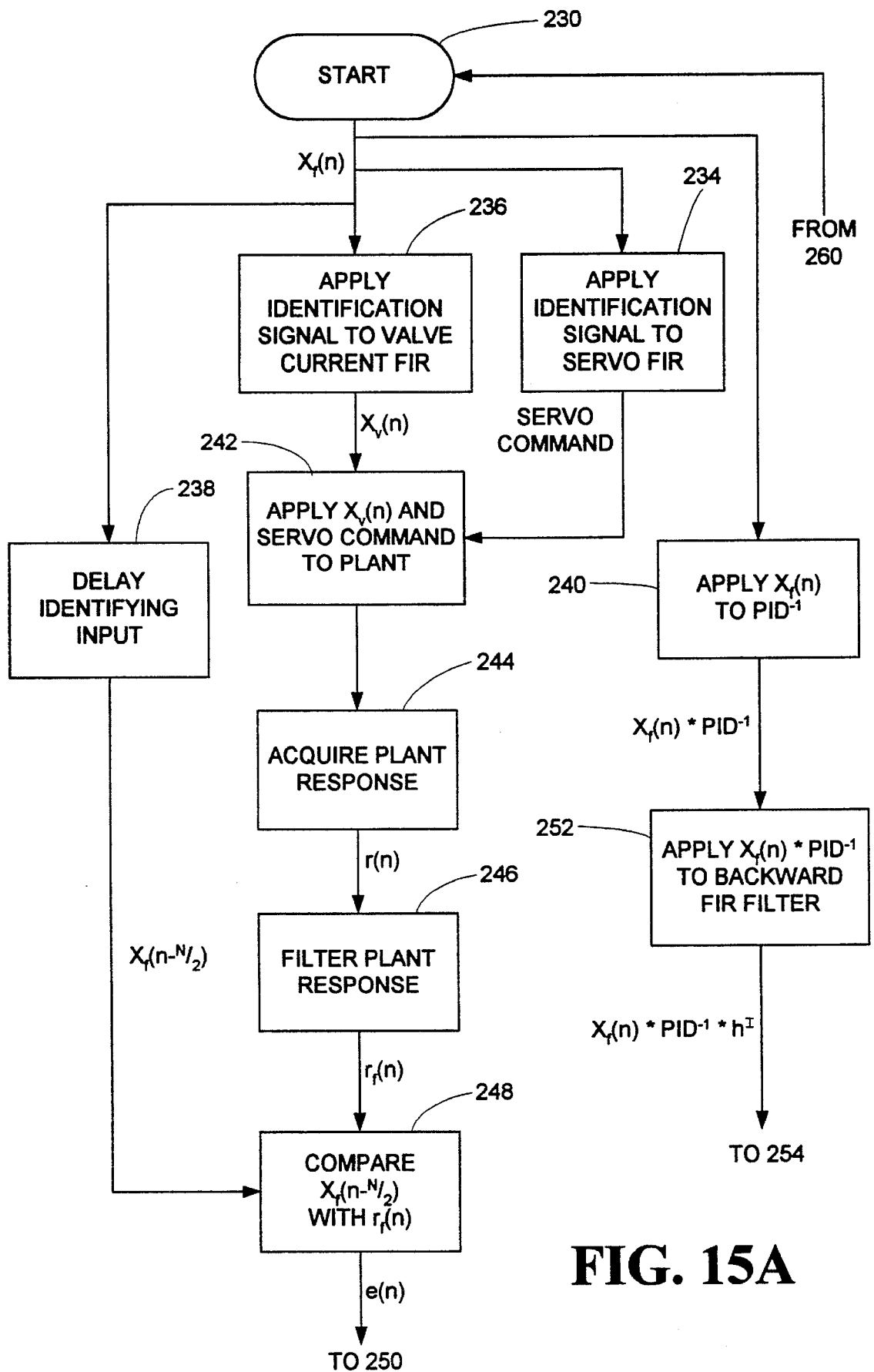
FIGS. 15A and 15B together comprise a flow chart showing the adaption routine used in connection with the process of FIG. 14.
Figure 15B:
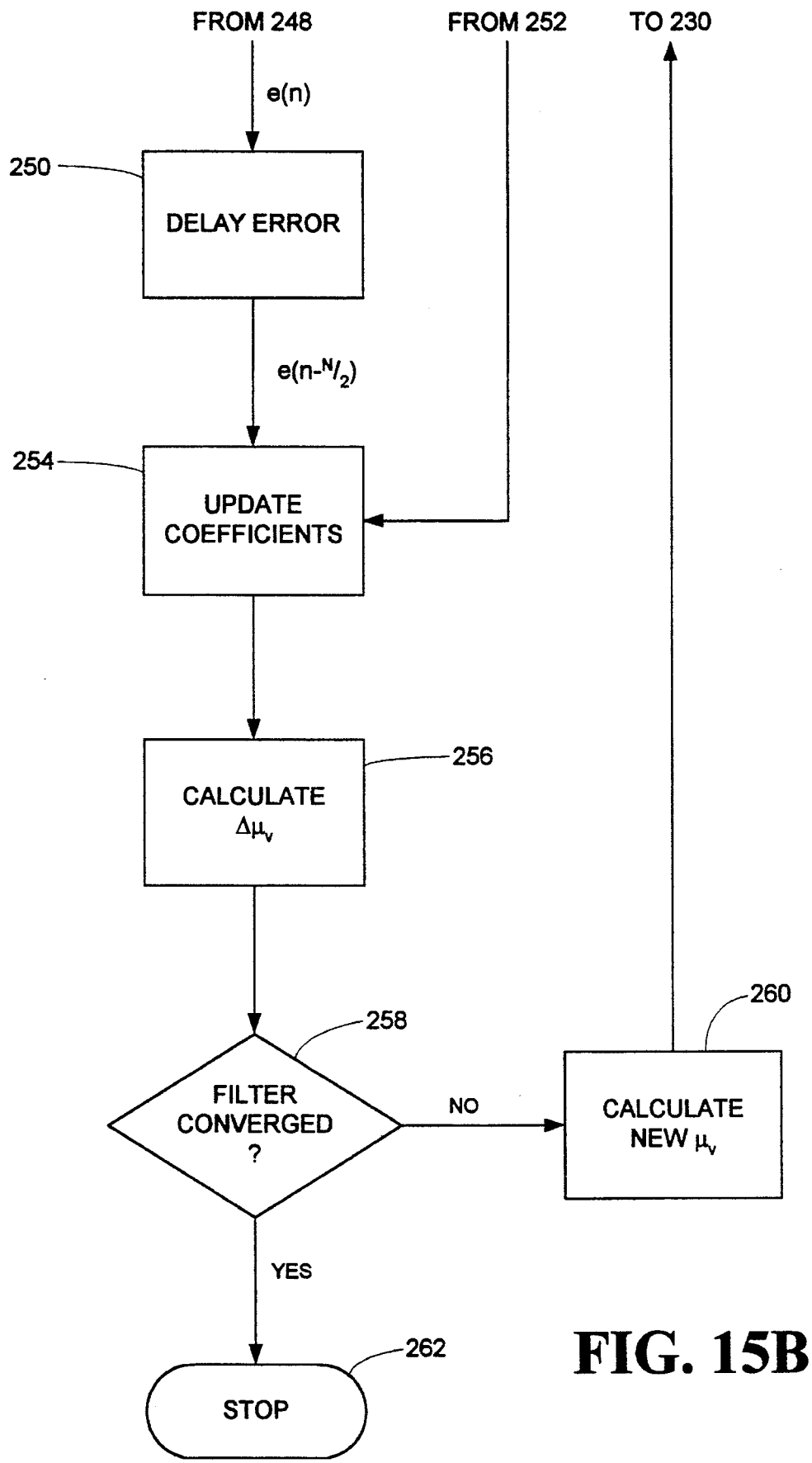

Turning now to FIGS. 15A and 15B, the procedure for generating the coefficients of valve current FIR filter 18 using the arrangement of FIG. 13 will now be described. The process begins at start block 232. As discussed in connection with FIG. 13, initially, the filtered identification signal is provided to servo FIR filter 16 (block 234), valve current FIR filter 18 (block 236), delay 194 (block 238), and $PID^{-1}$ stage 198 (block 240). The compensated input signal $x_v(n)$ generated by valve current FIR filter 18 and the servo command produced by servo FIR filter 16 are used to drive plant 34 (block 242). Then the plant's response is acquired (block 244) and filtered (block 246) by bandpass filter 208 to thereby provide the filtered representation $r_f(n)$ of the plant's response. The filtered representation is then subtracted from the delayed identification input at summing junction 196 to generate the error $e(n)$ (block 248). The error is then delayed by delay 210 and then provided to multiplication node 206 (block 250). While the steps represented by blocks 234, 236, 238, and 242 through 250 are being executed, blocks 240 and 252 are generating the adjusted input signal that is also provided to multiplication node 206. The identification input signal is first transformed by $PID^{-1}$ stage 198 (block 240) and then by backwards FIR filter 204 (block 252) into the adjusted input signal. The output of multiplication node 206 is provided to valve current FIR filter 18 for the purpose of updating the coefficients (block 254).

Once each of the filter coefficients have been updated, a new value of the valve current convergence gain must be determined for the next iteration through blocks 234 through 254. Thus, an incremental change $\Delta\mu_v$ is first determined (block 256) based upon whether the error for the current iteration is better (smaller) or worse (larger) than that from the previous iteration. If the error is better, then $\Delta\mu_v$ is calculated to be a positive number (so that the next convergence gain will be higher) and at a rate of $0.1\mu_v$ per second. If the error is worse, then $\Delta\mu_v$ is calculated to be a negative number (so that the next convergence gain will be lower) and at a rate of $-0.2\mu_v$ per second. Once $\Delta\mu_v$ is determined, it is checked to determine whether it is negative and of a magnitude less than 0.01% of the initial convergence gain determined prior to the start of the valve current FIR filter adaption routine (block 258). If not, an updated valve current convergence gain is calculated (block 260) by adding $\Delta\mu_v$ to the current value of $\mu_v$ and the process returns to start block 232. If so, the filter is considered to have converged and the process ends at stop block 262.

Cross FIR Filter Adaption Routine

Thus far the description of the preferred embodiment has focussed on controlling a single controlled variable (i.e., acceleration of actuator 12) within plant 34. However, there is often a need to control two or more controlled variables simultaneously within a single plant or system. Such systems are often referred to as multiple input, multiple output systems. A four poster test rig of the type used in vehicle suspension testing is such a system. It includes four hydraulic actuators to provide vertical excitation to each of the vehicle's four wheels. Moreover, the test rig may also include additional actuators for each wheel that provide excitations along the other orthogonal axes, in which case the system would require a twelve channel controller.

In physical systems in which there are multiple controlled variables, there is almost invariably physical coupling between the controlled variables. That is, adjusting one of the controlled variables will result in a change (response) of the other controlled variables due to the physical coupling in the system. In a four poster test rig that controls the acceleration of the four wheels, driving one of the hydraulic actuators to vertically accelerate its corresponding wheel will result in an acceleration response of each of the other wheels.

Using the servo FIR filter 16, valve current FIR filter 18, and error store 20, highly accurate control of a controlled variable can be obtained. However, if multiple controlled variables are involved, using a separate set of FIR filters and error store for each channel may not provide the desired level of control due to the coupling between the controlled variables. Therefore, cross FIR filters 50 of FIG. 1 can be used to provide the necessary compensation. For the purposes of explanation, a two channel controller will be described. It will of course be understood that the principle can be extended to any arbitrary number of channels.

Figure 16:
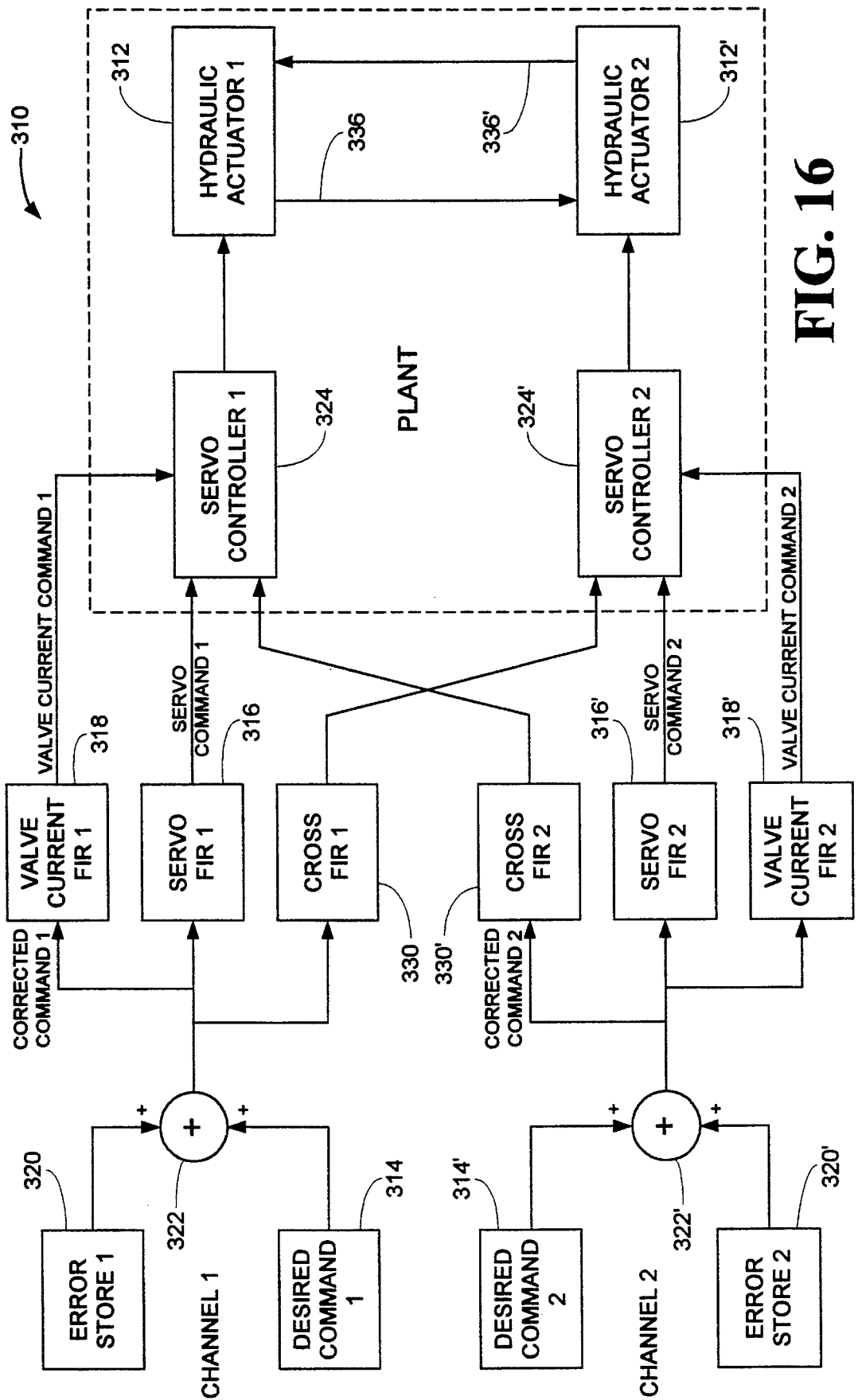
FIG. 16 is a block diagram showing a two channel controller of the present invention that includes two cross coupling FIR filters for cross channel decoupling.

Referring to FIG. 16, a two-channel controller 310 is shown. Channel 1 controls a hydraulic actuator 312 in response to a desired command 314. As with controller 10 of FIG. 1, channel 1 includes a servo FIR filter 316, a valve current FIR filter 318, a non-linear error store 320, and a summing junction 322. Servo FIR filter 316 and valve current FIR filter 318 together drive actuator 312 via a servo controller 324. Channel 1 also includes a cross FIR filter 330 that provides a first cross coupling signal to channel 2. Channel 2 has a similar arrangement that includes a corresponding element for each of the elements of channel 1. Accordingly, the reference numerals used for the components of channel 1 have been used for the corresponding components of channel 2 with a prime added so that the components can be distinguished. As FIG. 16 indicates, actuators 312 and 312' along with servo controllers 324 and 324' together define the plant 334. Physical coupling between actuators 312 and 312' is indicated by arrows 336 and 336'. Although not shown, controller 310 can include the real-time verification circuitry and alarm limit circuitry shown in FIG. 1.

Each of the cross FIR filters 330 and 330' operate in response to their channel's corrected command to produce a cross coupling signal that drives the other channel's actuator in such a manner as to reduce the effect of the physical coupling of their channel's actuator to the other channel's actuator. The cross FIR filters can be connected to receive either the desired or corrected command. The cross coupling signals from the cross FIR filters are shown in FIG. 16 as being a third input to the servo controllers since they can be combined with either the servo commands or the valve current commands. In the embodiment shown in FIG. 1, for example, they are combined with the valve current command.

Figure 17:
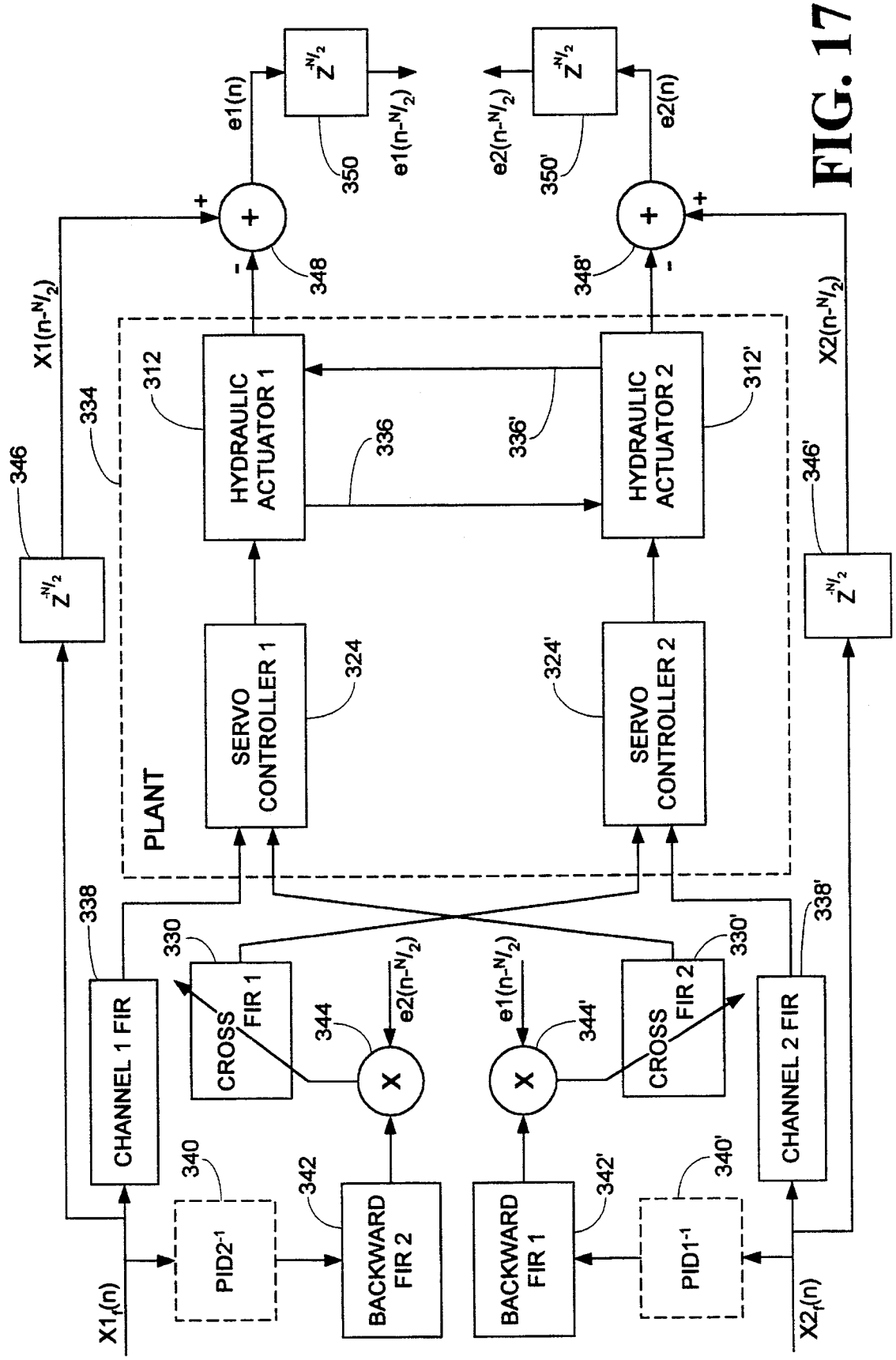
FIG. 17 is a block diagram showing a preferred circuit for generating the coefficients of the cross coupling FIR filters of FIG. 16.

Regardless of where their outputs are injected into their associated servo controllers, cross FIR filters 330 and 330' are determined using the forward drive inverse identification adaption routine described above. FIG. 17 depicts the arrangement used for generating the coefficients. Assuming the cross coupling signals are combined with the valve current commands and using the analysis discussed above in connection with valve current FIR filter 18, the coefficient update equations are:

$$c1_k(n+1) = \qquad (30)$$

$$c1_k(n) + \mu 1 e2 \left( n - \frac{N}{2} \right) h2 * PID2^{-1} * x1(n-k)w(k),$$

where:
- $c1_k$ is the kth coefficient of coefficients $c1_0, c1_1, \ldots c1_N$, with N being the number of coefficients of the cross coupling filter 330,
- $\mu 1$ is a convergence gain,
- $e2(n)$ is the second channel error,
- $h2$ is the transfer function of servo controller 324' and actuator 312',
- $PID^{-1}$ is the inverse of the PID transfer function of servo controller 324',
- $x1(n)$ is the identification input to channel 1, and
- $w(k)$ is a window function, and $$c2_k(n+1) = \qquad (31)$$

$$c2_k(n) + \mu 2 e1 \left( n - \frac{N}{2} \right) h1 * PID1^{-1} * x2(n-k)w(k),$$

where:
- $c2_k$ is the kth coefficient of coefficients $c2_0, c2_1, \ldots c2_N$, with N being the number of coefficients of the cross coupling filter 330',
- $\mu 2$ is a convergence gain,
- $e1(n)$ is the first channel error,
- $h1$ is the transfer function of servo controller 324 and actuator 312,
- $PID1^{-1}$ is the inverse of the PID transfer function of servo controller 324,
- $x2(n)$ is the identification input to channel 2, and
- $w(k)$ is a window function.

Equation (28) can be used to approximate $PID1^{-1}$ and $PID2_{-1}$.

Assuming the cross coupling signals are combined with the servo commands, the equations would be:

$$c1_k(n+1) = c1_k(n) + \mu 1 e2 \left( n - \frac{N}{2} \right) h2 * x1(n-k)w(k), \qquad (32)$$

and $$c2_k(n+1) = c2_k(n) + \mu 2 e1 \left( n - \frac{N}{2} \right) h1 * x2(n-k)w(k). \qquad (33)$$

Certain points regarding the construction of controller 310 and the generation of the FIR filters should be noted. Any particular channel of controller 310 can be implemented using only its cross FIR filter and either a servo FIR filter or a valve current FIR filter. Both the servo and valve current FIR filters need not be used. Whatever the arrangement, updating of the coefficients of the cross FIR filter should be accompanied by updating of the FIR filter within that same channel using the forward drive scheme of adaption. For example, if the valve current FIR filter is not going to be used and the servo FIR filter has already been generated using the procedure described above in connection with servo FIR filter 16, then when the cross FIR filter is generated, the servo FIR filter should at the same time be further adapted using the forward drive adaption routine. If, in that example, the servo FIR were to be adapted from the outset using the forward drive adaption routine, then it could be done concurrently with the cross FIR filter. In that case the inverse would have to first be modelled in order to get the transfer function of the plant used in the coefficient update equations. This concurrent adaption of the cross FIR filter and the FIR filter controlling that channel (whether a servo or valve current FIR filter) permits the FIR filter controlling that channel to adapt to any back-coupling between the controlled variables that occurs due to the use of the cross FIR filter.

Accordingly, in FIG. 17 each channel is shown with only one FIR filter that controls that channel's actuator. That FIR filter can be either a servo FIR filter or a valve current FIR filter (or both could be used) and will be updated concurrently with that same channel's cross FIR filter. Channel 1 includes cross FIR filter 330, a channel 1 FIR filter 338, a $PID2^{-1}$ stage 340, a backward FIR filter 342, a multiplication node 344, a first delay 346, a summing junction 348, and a second delay 350. Channel 2 includes corresponding elements that are again denoted with primed numerals. The arrangements for updating the coefficients for channel 1 FIR filter 338 and channel 2 FIR filter 338' are not shown as they are the same as that shown in FIG. 13. $PID2^{-1}$ stage 340 and $PID1^{-1}$ stage 340' are indicated in broken lines since they are not used if the injection points of the cross FIR filters are the inputs of the PID stages. Cross FIR filter 330, channel 1 FIR filter 338, and delay 346 all receive a filtered identification signal $x1_f(n)$ which can be generated in the same manner as that used for valve current FIR filter 18. Also, if used, $PID2^{-1}$ stage 340 also receives $x1_f(n)$. The output of $PID2^{-1}$ stage 340 is provided to backward FIR filter 342, which generates an adjusted input which is the filter update signal used to update the filter coefficients via multiplication node 344. If $PID2^{-1}$ stage 340 is not used, then backward FIR filter 342 receives $x1_f(n)$ directly. Delay 346 delays the identification signal by approximately half the length of cross FIR filter 330.

Channel 1 FIR filter 338 transforms the identification signal into a digital filter output signal that is provided to plant 334, and more particularly, either to the input of the PID stage within servo controller 324 or to the output of that PID stage. An electrical representation r1(n) of the response of actuator 312 to the adjustments of actuators 312 and 312' is filtered by a bandpass filter (not shown). The filtered electrical representation r1$_f$(n) is provided to summing junction 348 where it is subtracted from the delayed identification signal to thereby generate a first channel error signal e1(n). The first channel error signal e1(n) is then delayed by approximately half the length of the FIR filters by delay 350 to account for the delay introduced by backward FIR filters 342 and 342'. The delayed first channel error is then used to update channel 1 FIR filter 338 using either equation (27) or (29).

Cross FIR filter 330 transforms the identification signal into a cross coupling output signal that is provided to servo controller 324' of channel 2, either before or after its PID stage. An electrical representation r2(n) of the response of actuator 312' to the adjustments of actuators 312 and 312' is filtered by a bandpass filter (not shown). The filtered electrical representation r2$_f$(n) is provided to summing junction 348'. Summing junction 348' also receives a delayed second identification signal which is generated by delay 346' using a second filtered identification signal x2$_f$(n). Subtraction of the filtered electrical representation r2$_f$(n) from the delayed second identification signal results in a second channel error signal e2(n). The second channel error signal e2(n) is then delayed approximately half the length of the FIR filters by delay 350' to account for the delay introduced by backward FIR filters 342 and 342'. The delayed second channel error is then provided to multiplication node 344. Although not shown, multiplication node 344 also receives a cross convergence gain $\mu 1_c$ and a window function, as specified by equations (30) and (32).

Cross FIR filter 330', channel 2 FIR filter 338', and delay 346', all receive the second filtered identification signal x2$_f$(n). Also, if used, PID1$^{-1}$ stage 340' also receives x2$_f$(n). The output of PID1$^{-1}$ stage 340 is provided to backward FIR filter 342', which generates an adjusted input which is the filter update signal used to update the filter coefficients via multiplication node 344'. If PID1$^{-1}$ stage 340 is not used, then backward FIR filter 342' receives x2$_f$(n) directly. Channel 2 FIR filter 338' transforms the second identification signal into a digital filter output signal that is provided either to the input of the PID stage within servo controller 324' or added to the output of that PID stage. As discussed above, the response of actuator 312' to the adjustments of actuators 312 and 312' is used to generate the delayed second channel error. That error is then used to update channel 2 FIR filter 338' using either equation (27) or (29).

Cross FIR filter 330' transforms the second identification signal into a second cross coupling output signal that is provided to servo controller 324 of channel 1, either before or after its PID stage. The delayed first channel error that is used to update channel 1 FIR filter 338 is also used to update cross FIR filter 330'. Therefore, it is provided to multiplication node 344'. Although not shown, multiplication node 344' also receives a cross convergence gain $\mu 2_c$ and a window function, as specified by equations (31) and (33).

Preferably, cross FIR filters 330 and 330' and channel FIR filters 338 and 338' are all adapted at the same time. However, if desired, cross FIR filter 330 and channel 1 FIR filter 338 can be adapted together without cross FIR filter 330' or channel 2 FIR filter 338'. Conversely, cross FIR filter 330' and channel 2 FIR filter 338' can be adapted together without cross FIR filter 330 or channel 2 FIR filter 338. If only cross FIR filter 330 and channel 1 FIR filter 338 were to be adapted together, then no second identification signal x2$_f$(n) would be used (i.e., channel 2 would not be run).

Identification signal x1$_f$(n) would be used to control actuator 312 via channel 1 FIR filter 338 and actuator 312' via cross FIR filter 330. Actuator 312' would be controlled only by cross FIR filter 330 since the x2$_f$(n) would be zero. Thus, the second channel error would be equal to the filtered electrical representation r2$_f$(n). The converse would be true for updating cross FIR filter 330' and channel 2 FIR filter 338' using only the second identification signal x2$_f$(n).

The procedure for generating the coefficients using the arrangement of FIG. 17 is, for each of the FIR filters being adapted, the same as that discussed in connection with FIGS. 14, 15A, and 15B. Therefore, the description of that procedure will not be repeated.

Non-Linear Error Store

Figure 18:
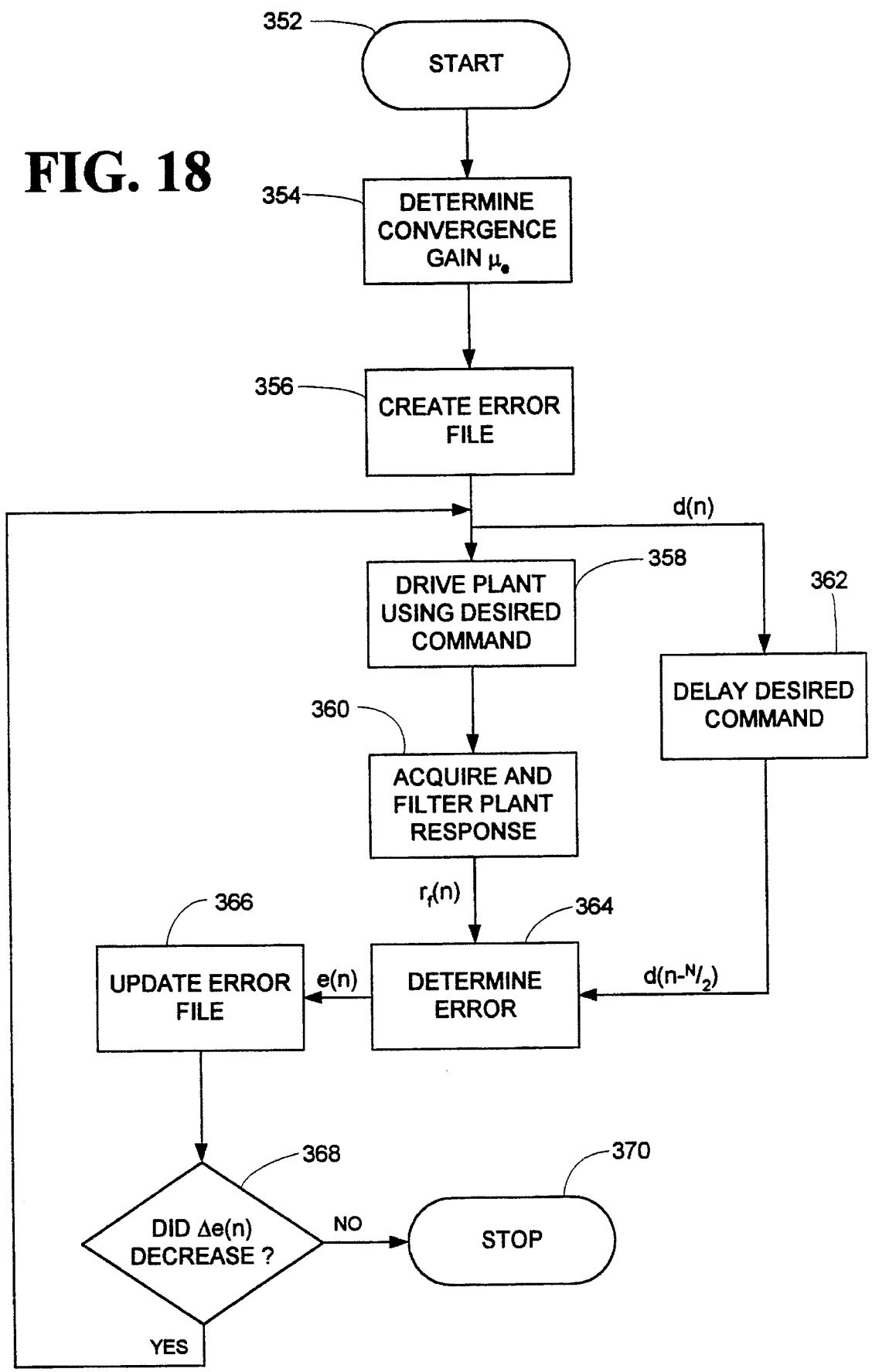
FIG. 18 is a flow chart showing the process for determining the non-linear error store used in the controllers of FIGS. 1 and 16.

Referring to FIGS. 1 and 18, the process for generating error store 20 will now be described. Once all of the FIR filters have been generated and placed in the arrangement depicted in FIG. 1, the process begins at start block 352. First, an error convergence gain $\mu_e$ is chosen by the operator (block 354). The error convergence gain can be a percentage value that, for each iteration, is multiplied times the error to get an update error $\Delta e(n)$ that is a percentage of the error e(n) measured for that iteration. Next, an error file is created (block 356) that will be used as error store 20. Initially, error store 20 is set to zero at all data points.

Once the error file is created, controller 10 is run (block 358) using desired command 14 (which may have previously been filtered by a bandpass filter) and error store 20. The response of actuator 12 is acquired and filtered by bandpass filter 46 (block 360), thereby providing a filtered representation r$_f$(n) of the response. While the steps represented by blocks 358 and 360 are being executed, desired command 14 is delayed by delay 40 (block 362). The filtered representation r$_f$(n) is then subtracted from the delayed desired command 14 to generate the error e(n) (block 364). The error file is then updated (block 366) using the following equation:

$$err_{i+1}(n) = err_i(n) + \Delta e_i(n), \quad (34)$$

where err(n) is the stored error and $\Delta e(n)$ is defined by:

$$\Delta e_i(n) = \mu_e e_i(n). \quad (35)$$

Once the error file is updated, the update error $\Delta e(n)$ is compared to its previous value (i.e., $e_{i-1}(n)$) to see if it has decreased (block 368). If so, then another iteration of blocks 358 to 366 is performed. If the update error has not changed or has increased, then convergence is assumed and the process ends at stop block 370.

Once non-linear error store 20 has been generated, controller 10 is ready to control plant 34 for testing or any other desired purpose. Referring again briefly to FIGS. 16 and 17, the same process would be used to generate error stores 320 and 320' of controller 310. Error store 320 would be created and updated using first channel error e1(n) and error store 320' would be created and updated using second channel error e2(n). In the event there is non-linear coupling between the channels, error store 320 and 320' should be determined concurrently.

Miscellaneous Remarks

Each of the bandpass filters discussed in connection with FIGS. 1–18 operate to remove any frequency components that are outside the range in which control of the plant is desired. They can be implemented, for example, using an 8th order Chebyshev low pass filter and a 3rd order Butterworth high pass filter.

It will of course be appreciated that the circuits, processes, and other arrangements disclosed in FIGS. 1–18 can be implemented in various ways, such as using a microprocessor, a digital signal processor, or both. Preferably, the controllers (whether controller 10 or controller 310) are implemented along with their associated servo controller using a digital signal processor.

The FIR filters should have a length chosen which provides the accuracy of control required for a particular application. Preferably, the FIR filters all have the same length which, in the illustrated embodiment is 1001 points.

It will thus be apparent that there has been provided in accordance with the present invention a multi-channel controller using adaptive finite impulse response filters and a method of generating that controller which achieve the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

I claim:

1. A method of producing a time domain digital filter having a transfer function that is the inverse of a system that produces noise at frequencies outside of a frequency range within which control of the system is desired, comprising the steps of:

(a) applying an input signal to a system that provides a resultant response, the input signal including frequency components within a desired range of frequencies, (b) filtering an electrical representation of the resultant response to remove any noise generated by the system that is outside the desired range of frequencies and to thereby provide a filtered representation of the resultant response, (c) applying the filtered representation to an adaptive time domain digital filter, the digital filter thereby generating a digital filter output signal, (d) delaying the input signal, (e) determining an error using the digital filter output signal and the delayed input signal, (f) updating the digital filter's coefficients in accordance with the error, and (g) iteratively repeating steps (c) through (f).

2. The method of claim 1, wherein step (f) further comprises updating the digital filter's coefficients using the error and the filtered representation of the resultant response.

3. The method of claim 2, wherein step (d) further comprises delaying the input signal by an amount of time approximately equal to half the length of the digital filter and wherein step (g) further comprises iteratively repeating steps (a) through (f).

4. The method of claim 2, wherein the digital filter comprises a finite impulse response filter that includes N coefficients and wherein step (f) further comprises the step of updating the coefficients in accordance with the following equation:

$$a_k(n+1)=a_k(n)+\mu e(n)r_f(n-k)w(k),$$

where:

$a_k(n)$ is the kth coefficient of coefficients $a_0, a_1, \ldots a_N$, $\mu$ is a convergence gain, $r_f(n)$ is the filtered representation of the resultant response, $e(n)$ is the error, and $w(k)$ is an optional window function that causes the coefficients at both ends of the digital filter to decrease toward zero.

5. The method of claim 4, wherein the window function is equal to one at all points.

6. The method of claim 4, wherein the convergence gain is determined in accordance with the power of the filtered representation of the resultant response.

7. The method of claim 2, further comprising, prior to step (a), the step of filtering out of the input signal any frequency components that are outside the desired range of frequencies.

8. A method of producing a time domain digital filter having a transfer function that is the inverse of a system, comprising the steps of:

(a) transforming an input signal into a compensated input signal using an adaptive time domain digital filter, (b) applying the compensated input signal to a system that provides a system response in accordance with a system transfer function, (c) transforming the input signal into an adjusted input signal using a second time domain digital filter that has substantially the same phase as the system transfer function, (d) delaying the input signal, (e) determining an error using the system response and the delayed input signal, (f) delaying the error and updating the first-mentioned digital filter's coefficients in accordance with the adjusted input signal and the delayed error, and (g) iteratively repeating steps (a), (b), (d), (e), and (f).

9. The method of claim 8, further comprising delaying the input signal and error by approximately half the length of the first-mentioned digital filter.

10. The method of claim 8, wherein the second digital filter's transfer function is substantially the same as the system transfer function.

11. The method of claim 8, further comprising the step of using the system transfer function to iteratively calculate the coefficients of the second digital filter.

12. The method of claim 8, wherein the second digital filter has an amplitude frequency response that is substantially the inverse of that of the system transfer function.

13. The method of claim 12, further comprising producing the second digital filter prior to step (a) by the following steps:

(1) applying a second input signal to the system such that the system provides a resultant response, (2) applying an electrical representation of the resultant response to the second digital filter, the second digital filter thereby generating a digital filter output signal, (3) delaying the second input signal to provide a second delayed input signal, (4) determining a second filter error by comparing the digital filter output signal with the second delayed input signal, (5) updating the second digital filter's coefficients in accordance with the second filter error, (6) iteratively repeating steps (1) through (5), and (7) transposing the second digital filter's coefficients.

14. The method of claim 13, wherein the second digital filter comprises a finite impulse response filter that includes N coefficients and wherein step (5) further comprises updating the second digital filter's coefficients in accordance with the following equation:

$$a_k(n+1)=a_k(n)+\mu e(n)r_f(n-k)w(k),$$

where:

$a_k(n)$ is the kth coefficient of coefficients $a_0, a_1, \ldots a_N$, $\mu$ is a convergence gain, $r_f(n)$ is the electrical representation of the resultant response, $e(n)$ is the second filter error, and $w(k)$ is an optional window function that causes the coefficients at both ends of the digital filter to decrease toward zero.

15. The method of claim 8, further comprising the step of providing a servo controller having a PID stage that has a transfer function and that includes a PID input, a PID output coupled to the system, and a PID feedback from the system that is coupled to the PID input, wherein step (b) further comprises applying the compensated input signal to the PID output, and wherein step (c) further comprises generating the adjusted input signal using the inverse of the PID stage's transfer function.

16. The method of claim 15, wherein the first-mentioned digital filter comprises a finite impulse response filter that includes N coefficients and wherein step (e) further comprises updating the second digital filter's coefficients in accordance with the following equation:

$$b_k(n+1)=b_k(n)+\mu e(n-n_0)h'^*PID^{-1}*x(n-k)w(k),$$

where:

$b_k(n)$ is the kth coefficient of coefficients $b_0, b_1, \ldots b_N$, $\mu$ is a convergence gain, $e(n)$ is the error, $n_0$ is the delay applied to the error, $h'$ is a transfer function having the same phase but inverse amplitude frequency response as the combined transfer function of the PID stage and the system, $PID^{-1}$ is the inverse transfer function of the PID stage, $x(n)$ is the input signal, and $w(k)$ is an optional window function that causes the coefficients at both ends of the digital filter to decrease toward zero.

17. The method of claim 16, wherein $PID^{-1}$ is an approximation for the inverse transfer function of the PID stage and is defined by the equation:

$$PID^{-1}(x) = K\left[ Px - I\sum_{k=0}^{N-1} x_k z^{-k} - D(x - xz^{-1}) \right],$$

where:

K is a constant of proportionality,

P is a proportional gain,

I is an integral gain, and

D is a differential gain.

18. The method of claim 8, wherein step (f) further comprises updating the coefficients using a variable convergence gain that is determined in accordance with the power of the adjusted input signal.

19. The method of claim 8, further comprising the steps of:

defining a range of frequencies over which operation of the system is desired, prior to step (a), filtering out of the input signal any frequency components that are outside the desired range of frequencies, and prior to step (c), filtering out of the system response any frequency components that are outside the desired range of frequencies.

20. The method of claim 8, wherein step (e) further comprises the step of calculating the error by subtracting the system response from the delayed input signal.

21. A method of providing a controller having a first channel responsive to a first command to adjust a first controlled variable within a system and having a second channel for adjusting a second controlled variable within the system, the method comprising the steps of:

(a) providing a first time domain digital filter within the first channel that transforms a first input signal into a first digital filter output signal, (b) providing a first cross coupling time domain digital filter between the first and second channels such that the first cross coupling filter transforms the first input signal into a first cross coupling filter output signal that is provided to the second channel, and (c) generating coefficients for the first cross coupling filter using multiple iterations of the following steps:

(c1) applying the first input signal to the first digital filter, (c2) applying the first input signal to the first cross coupling filter, (c3) adjusting the first controlled variable using the first digital filter output signal and adjusting the second controlled variable using the first cross coupling filter output signal, (c4) acquiring an electrical representation of the response of the second controlled variable to the adjustments of the first and second controlled variables, (c5) determining a second channel error using the electrical representation of the response of the second controlled variable, and (c6) updating the first cross coupling filter's coefficients using the second channel error.

22. The method of claim 21, wherein step (c) further comprises generating coefficients for the first digital filter and wherein:

step (c4) further comprises acquiring an electrical representation of the response of the first controlled variable to the adjustments of the first and second controlled variables, step (c5) further comprises delaying the first input signal and determining a first channel error using the delayed first input signal and the electrical representation of the response of the first controlled variable, and step (c6) further comprises updating the first digital filter's coefficients using the first channel error.

23. The method of claim 22, wherein step (c5) further comprises using the electrical representation of the response of the second controlled variable as the second channel error.

24. The method of claim 22, wherein step (a) further comprises providing a second time domain digital filter within the second channel that transforms a second input signal into a second digital filter output signal, and wherein:

step (c1) further comprises applying the second input signal to the second digital filter, step (c3) further comprises adjusting the second controlled variable using the first cross coupling filter output signal and the second input signal, and step (c5) further comprises delaying the second input signal and determining the second channel error using the delayed second input signal and the electrical representation of the response of the second controlled variable.

25. The method of claim 24, wherein step (b) further comprises providing a second cross coupling time domain digital filter between the first and second digital filters such that the second cross coupling filter transforms the second input signal into a second cross coupling filter output signal that is provided to the first channel, wherein the method further comprises the steps of:
(g) generating a third adjusted input signal using the second input signal and the second selected transfer function, and
(h) generating a fourth adjusted input signal using the second input signal and the first selected transfer function, wherein step (c) further comprises generating coefficients for the second digital filter and the second cross coupling filter, and wherein:

step (c2) further comprises applying the second input signal to the second cross coupling filter, step (c3) further comprises adjusting the first controlled variable using the first digital filter output signal and the second cross coupling filter output signal and adjusting the second controlled variable using the second digital filter output signal and the first cross coupling filter output signal, step (c6) further comprises updating the second digital filter's coefficients using the third adjusted input signal and the second channel error and updating the second cross coupling filter's coefficients using the first channel error and the fourth adjusted input signal.

26. The method of claim 22, wherein the first channel has a first transfer function between the first digital filter's output and the response of the first controlled variable, the first transfer function comprising a first amplitude frequency response and a first phase response, and wherein the second channel has a second transfer function between the first cross coupling filter's output and the response of the second controlled variable, the second transfer function comprising a second amplitude frequency response and a second phase response, wherein the method further comprises the steps of:
(d) determining the first and second phase responses,
(e) generating a first adjusted input signal using the first input signal and a first selected transfer function having the first phase response and a first selected amplitude frequency response, and
(f) generating a second adjusted input signal using the first input signal and a second selected transfer function having the second phase response and a second selected amplitude frequency response, wherein step (c6) further comprises updating the first digital filter's coefficients using the first channel error and the first adjusted input signal and updating the first cross coupling filter's coefficients using the second channel error and the second adjusted input signal.

27. The method of claim 26, wherein the first selected amplitude frequency response is the inverse of the first amplitude frequency response and the second selected amplitude frequency response is the inverse of the second amplitude frequency response.

28. The method of claim 26, wherein step (e) further comprises transforming the first input signal into the first adjusted input signal using a third digital filter having the first selected transfer function and wherein step (c6) further comprises delaying the first channel error and updating the first digital filter's coefficients using the delayed first channel error and the first adjusted input signal, and wherein step (f) further comprises transforming the first input signal into the second adjusted input signal using a fourth digital filter having the second selected transfer function and wherein step (c6) further comprises delaying the second channel error and updating the first cross coupling filter's coefficients using the delayed channel error and the second adjusted input signal.

29. The method of claim 28, further comprising the step of:

(g) providing a second channel servo controller used to adjust the second controlled variable using the first cross coupling filter output signal, the second channel servo controller having a PID stage that has a PID transfer function and that includes a PID input, a PID output coupled to the second controlled variable, and a PID feedback coupled between the second controlled variable and the PID input, wherein step (f) further comprises generating the second adjusted input signal using the fourth digital filter and the inverse of the PID transfer function, and wherein step (c3) further comprises applying the first cross coupling filter output signal to the PID output.

30. The method of claim 29, wherein step (c6) further comprises updating the first cross coupling filter's coefficients in accordance with the following equation:

$$c1_k(n+1)c1_k(n)+\mu 1 e2(n-n_0)h2*PID2^{-1}*x1(n-k)w(k),$$

where:
$c1_k$ is the kth coefficient of coefficients $c1_0, c1_1, \ldots c1_N$, with N being the number of coefficients of the first cross coupling filter, $\mu 1$ is a convergence gain, $e2(n)$ is the second channel error, $n_0$ is the delay applied to the second channel error, $h2$ is the second selected transfer function, $PID2^{-1}$ is the inverse of the PID transfer function, $x1(n)$ is the first input signal, and $w(k)$ is an optional window function that causes the coefficients at both ends of the first cross coupling filter to decrease toward zero.

31. The method of claim 30, wherein $PID2^{-1}$ is an approximation for the inverse of the PID transfer function and is defined by the equation:

$$PID2^{-1}(x) = K \left[ Px - I \sum_{k=0}^{N-1} x_k z^{-k} - D(x - xz^{-1}) \right],$$

where:
K is a constant of proportionality,

P is a proportional gain,

I is an integral gain, and

D is a differential gain.

32. A method of generating coefficients for a time domain digital filter, comprising the steps of:

(a) providing a composite input signal having a spectral content, (b) providing a filter update signal that is related to the composite input signal, (c) determining the amplitudes of the spectral components of the filter update signal, (d) providing a plurality of input signals using the spectral content of the composite input signal, wherein the input signals have different spectral contents determined in accordance with the amplitudes of the spectral components of the filter update signal, and (e) calculating the coefficients with an adaption routine by sequentially using the input signals as an identifying input signal of the adaption routine.

33. The method of claim 32, wherein step (c) further comprises determining the amplitudes of the spectral components of the filter update signal at selected frequencies and wherein step (d) further comprises associating one or more of the spectral components of the composite input signal with each of the selected frequencies, wherein the input signals have different spectral contents determined by:

(d1) identifying groups of the selected frequencies such that, for each group having more than one of the selected frequencies, the ratio of the amplitudes of any two of the spectral components of the filter update signal at the selected frequencies within that group is less than or equal to a maximum value, (d2) associating each of the groups with a different one of the input signals, and (d2) for each input signal, forming the input signal by combining together those spectral components of the composite input signal that are associated with the selected frequencies within the group associated with that input signal, wherein the adaption routine comprises (f) performing multiple iterations of the following steps:

(f1) using the identifying input signal to adjust a controlled variable, the controlled variable thereby providing a resultant response, (f2) acquiring an electrical representation of the resultant response, (f3) determining an error using the identifying input signal and the electrical representation of the resultant response, and (f4) updating the coefficients using the error and the filter update signal.

34. The method of claim 33, wherein step (e) further comprises sequentially applying the input signals in order beginning with the input signal associated with the group for which the spectral components of the filter update signal at the selected frequencies within that group have the smallest amplitude and ending with the input signal associated with the group for which the spectral components of the filter update signal at the selected frequencies within that group have the largest amplitude.

35. The method of claim 34, wherein the filter update signal is determined using a convolution of the composite input signal with a transfer function that is related to the controlled variable's transfer function, and wherein step (f1) further comprises applying the composite input signal to the digital filter to thereby generate a digital filter output signal and using the digital filter output signal to adjust the controlled variable.

36. The method of claim 34, wherein step (b) further comprises generating the filter update signal by the following steps:

(b1) using the composite input signal to adjust the controlled variable, the controlled variable thereby providing a corresponding response, (b2) acquiring a feedback signal that is representative of the corresponding response, and (b3) using the feedback signal as the filter update signal, wherein step (f3) further comprises applying the electrical representation of the resultant response to the digital filter to thereby generate a digital filter output signal, delaying the identifying input signal, and determining the error using the delayed identifying input signal and the digital filter output signal.

37. The method of claim 36, wherein step (a) further comprises:

(a1) providing a command that is to be used to adjust the controlled variable after generation of the coefficients, (a2) determining the amplitudes of the spectral components of the command, (a3) determining the composite input signal using an adjustable input signal and a plurality of adjustment factors, each of which corresponds to a different frequency band of the adjustable input signal and each of which is used to selectively amplify or attenuate the amplitudes of the spectral components of the adjustable input signal that are within its corresponding frequency band, (a4) adjusting the controlled variable using the adjustable input signal, (a5) acquiring a second feedback signal representing the response of the controlled variable to the adjustable input signal, (a6) determining the amplitudes of the spectral components of the second feedback signal, (a7) adjusting the adjustment factors in accordance with the relative amplitudes of the spectral components of the second feedback signal and the command, (a8) iteratively repeating steps (a3) through (a7) until the amplitudes of the spectral components of the second feedback signal are approximately the same as the amplitudes of the corresponding spectral components of the command, and wherein step (d) further comprises, for each frequency band, associating the spectral components of the composite input signal within that frequency band with one of the selected frequencies.

38. The method of claim 37, wherein the filter update signal is equal to the second feedback signal generated as a result of the last iteration of steps (a3) through (a7).

39. The method of claim 37, wherein:

step (a2) further comprises plotting the amplitude spectral content of the command on a display screen, step (a6) further comprises superimposing the amplitude spectral content of the second feedback signal over the amplitude spectral content of the command, and step (a7) comprises manually adjusting the adjustment factors.

40. The method of claim 34, wherein the plurality of input signals together comprise noise.

41. The method of claim 40, wherein each of the input signals is defined by the equation:

$$\text{input}_k = A_k \text{noise}_k \sin(\omega_k n + \theta_k),$$

where:

$A_k$ is an adjustment factor that sets the amplitude of the kth input signal, $\text{noise}_k$ is a noise band that is used for the kth input signal and that provides the band width of the kth input signal, $\omega_k$ is the center frequency of the kth input signal, and $\theta_k$ is the phase of the kth input signal, wherein the band widths and the center frequencies of each of the input signals are selected so that the input signals together comprise a shaped noise signal having a band width that spans a desired range of frequencies.

42. The method of claim 34, wherein step (e) further comprises the steps of:

(e1) providing an additive input signal that is initially set to be equal to a first one of the input signals, (e2) using the additive input signal as the identifying input signal of the adaption routine, (e3) using the adaption routine to initially determine the coefficients, (e4) adding to the additive input signal a next one of the input signals, (e5) using the additive input signal as the identifying input signal of the adaption routine, (e6) using the adaption routine to update the coefficients, and (e7) iteratively repeating steps (e4) through (e6) for each of the remaining input signals.

43. A method of generating an error correction for a controller that is responsive to a command to control a system in such a manner as to cause the system to perform the command, comprising the steps of:

(a) combining a desired command with an error correction to thereby generate a corrected command, (b) transforming the corrected command into a compensated command using a time domain digital filter that approximates the inverse of a system's transfer function, (c) applying the compensated command to the system, (d) acquiring an electrical representation of the response of the system to the compensated command, (e) delaying the command, (f) determining an error using the delayed command and the electrical representation, (g) updating the error correction using the error, and (h) iteratively repeating steps (a) through (g).

44. The method of claim 43, wherein step (e) further comprises delaying the command by an amount of time approximately equal to half the length of the digital filter.

45. The method of claim 43, further comprising, prior to step (a), the step of initially setting the error correction to zero, wherein step (f) further comprises determining the error by subtracting the electrical representation from the delayed command, and wherein step (g) further comprises updating the error correction by adding to the error correction a percentage of the error.

46. The method of claim 43, further comprising the steps of:

defining a range of frequencies over which operation of the system is desired, prior to step (f), filtering out of the electrical representation any frequency components that are outside the desired range of frequencies.

47. A channel for a controller having a plurality of channels, each of which is operable in response to a command to generate an output that is used to control a system in such a manner as to cause the system to perform the command, the channel comprising:

a controller input for receiving a first channel command;

a controller output providing a system command and capable of being coupled to a system to apply the system command to the system;

an error store for providing an error correction;

a first summing junction coupled to said controller input and said error store, said first summing junction being operable to combine the first channel command with the error correction to thereby generate a modified first channel command;

a servo controller having an input and an output coupled to said controller output;

a first time domain digital filter having an input coupled to receive the modified first channel command and an output coupled to said input of said servo controller;

a second time domain digital filter having an input coupled to receive the modified first channel command and an output coupled to said output of said servo controller;

a third time domain digital filter having an input coupled to receive a second channel command and an output coupled to said servo controller;

a feedback input capable of being coupled to the system to thereby provide an electrical representation of a system response to the system command;

a delay coupled to said controller input to provide a delayed first channel command; and a second summing junction coupled to said delay, said feedback input, and said error store, said second summing junction being operable to combine the delayed first channel command with the electrical representation to thereby generate an error and to provide the error to said error store.

48. A channel as defined in claim 47, wherein said output of said third digital filter is coupled to said output of said servo controller.

49. A channel as defined in claim 47, wherein said first digital filter is a finite impulse response filter defined by the following equation:

$$f1_{os}(n) = \sum_{k=0}^{N-1} a_k f1_{is}(n-k),$$

where:

$f1_{is}(n)$ is a filter input signal, $f1_{os}(n)$ is a filter output signal,

N is the number of coefficients of said first digital filter, and $a_k$ is the kth coefficient of coefficients $a_0, a_1, \ldots a_N$;

wherein said second digital filter is a finite impulse response filter defined by the following equation:

$$f2_{os}(n) = \sum_{k=0}^{M-1} b_k f2_{is}(n-k),$$

where:

$f2_{is}(n)$ is a filter input signal, $f2_{os}(n)$ is a filter output signal,

M is the number of coefficients of said second digital filter, and $b_k$ is the kth coefficient of coefficients $b_0, b_1, \ldots b_M$; and wherein said third digital filter is a finite impulse response filter defined by the following equation:

$$f21_{os}(n) = \sum_{k=0}^{L-1} c_k f21_{is}(n-k),$$

where $f21_{is}(n)$ is a filter input signal, $f21_{os}(n)$ is a filter output signal, L is the number of coefficients of said third digital filter, and $c_k$ is the kth coefficient of coefficients $c_0, C_1, \ldots C_L$.

50. A channel as defined in claim 49, wherein N, M, and L are substantially the same number and wherein said delay is operable to delay the first channel command by approximately half of that number.

\* \* \* \* \*

UNITED STATES PATENT AND TRADEMARK OFFICE
CERTIFICATE OF CORRECTION

PATENT NO.    :    5,623,402

DATED         :    April 22, 1997

INVENTOR(S)   :    Donald B. Johnson

It is certified that errors appear in the above-identified patent and that said Letters Patent is hereby corrected as shown below:

Abstract, cover page, line 23, delete "a plitude" and insert therefor --amplitude--. Column 19, line 64, delete "FIB" and insert therefor --FIR--. Column 25, line 46, delete "PID$^{-1}$" and insert therefor --PID2$^{-1}$--. Column 26, line 2, delete "PID2$_{-1}$" and insert therefor --PID2$^{-1}$--. Column 34, claim 28, line 13, before "channel" insert --second--. Column 40, claim 49, line 6, delete "$C_1, \ldots C_L$" and insert therefor --$c_1, \ldots c_L$--.

Signed and Sealed this

Thirteenth Day of January, 1998

Attest:

BRUCE LEHMAN

Attesting Officer

Commissioner of Patents and Trademarks